(12) United States Patent
Cheriton

(10) Patent No.: US 11,232,096 B2
(45) Date of Patent: Jan. 25, 2022

(54) AUTOMATIC GENERATION OF AN EFFICIENT RULE SET IMPLEMENTATION

(71) Applicant: OptumSoft, Inc., Menlo Park, CA (US)

(72) Inventor: David R. Cheriton, Palo Alto, CA (US)

(73) Assignee: OptumSoft, Inc., Menlo Park, CA (US)

( * ) Notice: Subject to any disclaimer, the term of this patent is extended or adjusted under 35 U.S.C. 154(b) by 161 days.

(21) Appl. No.: 16/562,321

(22) Filed: Sep. 5, 2019

(65) Prior Publication Data

US 2020/0081882 A1 Mar. 12, 2020

Related U.S. Application Data

(60) Provisional application No. 62/728,028, filed on Sep. 6, 2018.

(51) Int. Cl.
*G06F 16/23* (2019.01)
*G06F 16/901* (2019.01)

(52) U.S. Cl.
CPC ...... *G06F 16/2379* (2019.01); *G06F 16/2358* (2019.01); *G06F 16/9024* (2019.01)

(58) Field of Classification Search
None
See application file for complete search history.

(56) References Cited

U.S. PATENT DOCUMENTS

| | | | |
|---|---|---|---|
| 5,899,985 A * | 5/1999 | Tanaka | G06N 5/046 706/45 |
| 7,895,666 B1 | 2/2011 | Eshghi | |
| 2002/0165701 A1 | 11/2002 | Lichtenberg | |
| 2003/0220926 A1* | 11/2003 | Huelsman | G06N 5/02 |
| 2006/0136428 A1 | 6/2006 | Syeda-Mahmood | |
| 2009/0157723 A1 | 6/2009 | De Peuter | |
| 2014/0013303 A1* | 1/2014 | Spitzer | G06F 9/44505 717/121 |
| 2015/0278395 A1 | 10/2015 | Ben Jemaa | |
| 2017/0206304 A1* | 7/2017 | Goodman | G06F 30/15 |
| 2019/0020546 A1* | 1/2019 | Bhandarkar | G06F 8/30 |
| 2019/0087513 A1* | 3/2019 | Mukherjee | G06F 9/00 |
| 2019/0220271 A1* | 7/2019 | Olderdissen | G06F 8/654 |
| 2019/0342178 A1* | 11/2019 | Balasubramanian | G06N 5/047 |

FOREIGN PATENT DOCUMENTS

WO  WO-2018169430 A1 *  9/2018  ....... G06F 16/24568

* cited by examiner

*Primary Examiner* — Richard L Bowen
(74) *Attorney, Agent, or Firm* — Van Pelt, Yi & James LLP

(57) ABSTRACT

Automatically generating a rule set implementation is disclosed. A set of rules is accessed. For each non-const rule in the set of rules, one or more implication directed acyclic graphs (DAGs) are constructed. The non-const rule directly causes at least one external output or at least one external action. The one or more implication DAGs specify rule conditions, including one or more observable rule conditions. Implication DAGs that are constructed for the set of rules are compiled to obtain a compiled result that is configured to evaluate rule conditions associated with the set of rules and determine one or more actions when at least one of the rule conditions evaluates to true. The compiled result is output.

20 Claims, 13 Drawing Sheets

```
302 ⌐
    UniLink : Element {
        connectsTo : Interface::Ptr;
        lossOfSignal : Subcondition {
            → connectsTo:::lossOfSignalIn;
        }
304 ⌐ }
    Link : Element {
        component : UniLink[2];
        cableBroken : Subcondition {
            `actionLabel =
    "reportCableBreak";
            → component::lossOfSignal;
        }
    }
306 ⌐ }
    Interface {
        lossOfSignalIn : Subcondition {
            → parent::lossOfSignalIn$;
        }
        connectedToBy : Interface {
            `inverse = UniLink::connectsTo;
        }
308 ⌐ }
    Switch : Element {
        component: Interface[X];
        lossOfSignalIn$ :: Subcondition {
            `observedBy = (signalIn==0);
        }
    }
```

AUTOMATIC GENERATION OF AN EFFICIENT RULE SET IMPLEMENTATION

CROSS REFERENCE TO OTHER APPLICATIONS

This application claims priority to U.S. Provisional Patent Application No. 62/728,028 entitled AUTOMATIC GENERATION OF AN EFFICIENT RULE SET IMPLEMENTATION filed Sep. 6, 2018 which is incorporated herein by reference for all purposes.

BACKGROUND OF THE INVENTION

Rule-based systems (RBS) have been used in the past for intelligent systems. For example, so-called expert systems were developed in the 1980's as part of the Stanford Heuristic Programming Project for mycin/dendral medical diagnosis, analysis of submarine sonar signals, and other applications. These systems typically structure each rule as a "condition:action" pair, where the rule condition indicates the Boolean condition that when it evaluates to true implies that the rule action is to be executed. Traditional RBS are often difficult to develop as well as maintain. They tend to have very high memory and processing requirements for execution. Therefore, traditional RBS are typically unsuitable for implementing complex applications that involve large number of possible conditions and decisions, such as automated driving, automated heating and cooling, etc.

BRIEF DESCRIPTION OF THE DRAWINGS

Various embodiments of the invention are disclosed in the following detailed description and the accompanying drawings.

FIG. 3 is an illustration of an embodiment of a simple model of a computer network.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Automatic generation of a rule set implementation is disclosed. This includes how to efficiently and reliably define and extend a complex rule set based on detailed and improved knowledge of cause and effect, and automatically generate an efficient implementation of a corresponding rule engine. Thus, as something new is learnt about conditions and actions, the rule set is extended to incorporate this new knowledge and refine the implementation to execute this revised rule set efficiently. Automatically generating the implementation of the complex rule sets required for various realistic applications that incorporates expert domain knowledge while avoiding high maintenance and execution overhead is disclosed.

Figure 1:
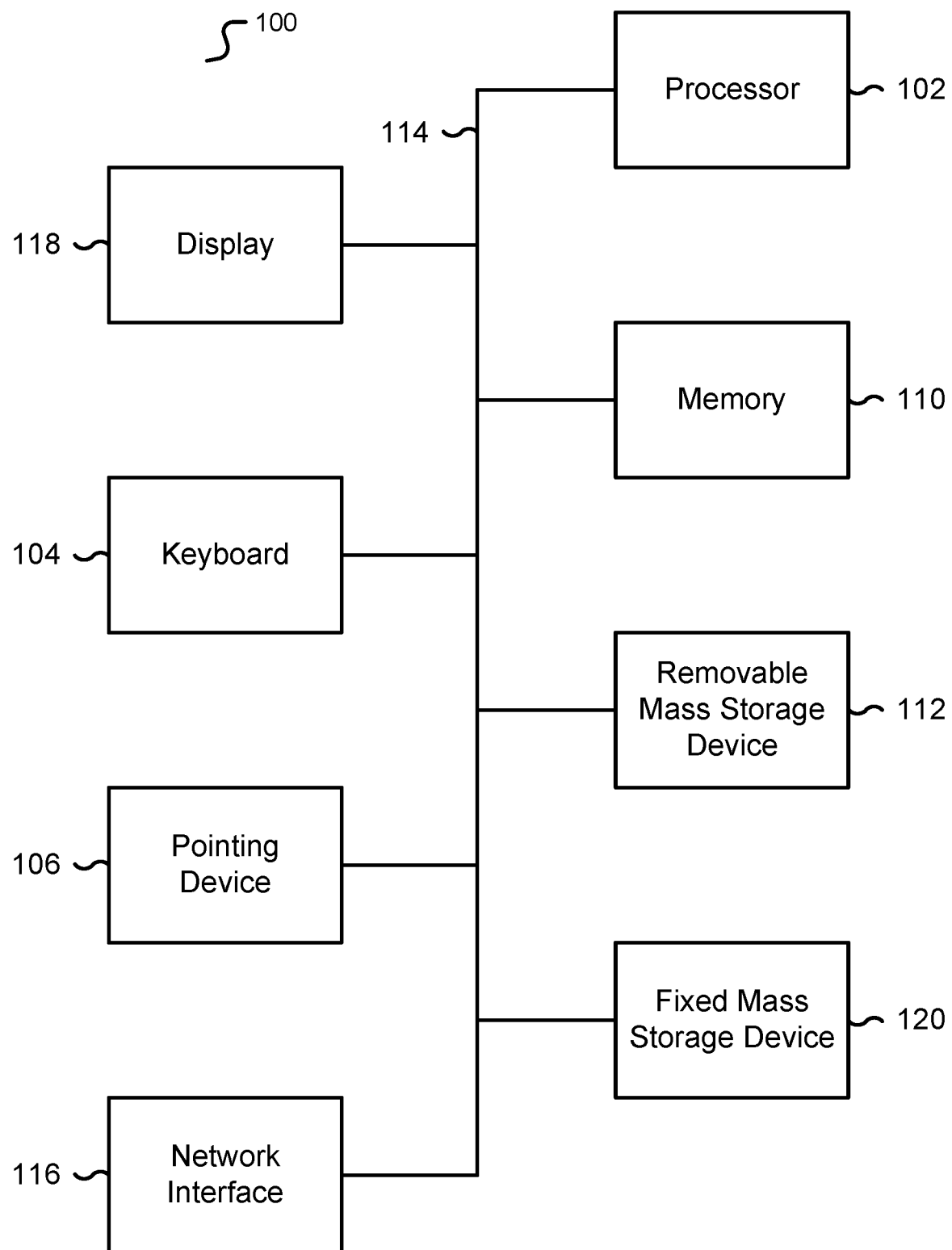
FIG. 1 is a functional diagram illustrating a programmed computer/server system for automatic generation of an efficient rule set implementation in accordance with some embodiments.

FIG. 1 is a functional diagram illustrating a programmed computer/server system for automatic generation of an efficient rule set implementation in accordance with some embodiments. As shown, FIG. 1 provides a functional diagram of a general purpose computer system programmed to provide automatic generation of an efficient rule set implementation in accordance with some embodiments. As will be apparent, other computer system architectures and configurations may be used for automatic generation of an efficient rule set implementation.

Computer system 100, which includes various subsystems as described below, includes at least one microprocessor subsystem, also referred to as a processor or a central processing unit ("CPU") (102). For example, processor (102) can be implemented by a single-chip processor or by multiple cores and/or processors. In some embodiments, processor (102) is a general purpose digital processor that controls the operation of the computer system 100. Using instructions retrieved from memory (110), the processor (102) controls the reception and manipulation of input data, and the output and display of data on output devices, for example display and graphics processing unit (GPU) (118).

Processor (102) is coupled bi-directionally with memory (110), which can include a first primary storage, typically a random-access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor (102). Also as well known in the art, primary storage typically includes basic operating instructions, program code, data, and objects used by the processor (102) to perform its functions, for example programmed instructions. For example, primary storage devices (110) can include any suitable computer-readable storage media, described below, depending on whether, for example, data access needs to be bi-directional or uni-directional. For example, processor (102) can also directly and very rapidly retrieve and store frequently needed data in a cache memory, not shown. The processor (102) may also include a coprocessor (not shown) as a supplemental processing component to aid the processor and/or memory (110).

A removable mass storage device (112) provides additional data storage capacity for the computer system 100, and is coupled either bi-directionally (read/write) or uni-directionally (read only) to processor (102). For example, storage (112) can also include computer-readable media such as flash memory, portable mass storage devices, holographic storage devices, magnetic devices, magneto-optical devices, optical devices, and other storage devices. A fixed mass storage (120) can also, for example, provide additional data storage capacity. One example of mass storage (120) is an eMMC or microSD device. In one embodiment, mass storage (120) is a solid-state drive connected by a bus (114). Mass storage (112), (120) generally store additional programming instructions, data, and the like that typically are not in active use by the processor (102). It will be appreciated that the information retained within mass storage (112), (120) can be incorporated, if needed, in standard fashion as part of primary storage (110), for example RAM, as virtual memory.

In addition to providing processor (102) access to storage subsystems, bus (114) can be used to provide access to other subsystems and devices as well. As shown, these can include a display monitor (118), a communication interface (116), a touch (or physical) keyboard (104), and one or more auxiliary input/output devices (106) including an audio interface, a sound card, microphone, audio port, audio recording device, audio card, speakers, a touch (or pointing) device, and/or other subsystems as needed. Besides a touch screen and/or capacitive touch interface, the auxiliary device (106) can be a mouse, stylus, track ball, or tablet, and is useful for interacting with a graphical user interface.

The communication interface (116) allows processor (102) to be coupled to another computer, computer network, or telecommunications network using a network connection as shown. For example, through the communication interface (116), the processor (102) can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor (102) can be used to connect the computer system 100 to an external network and transfer data according to standard protocols. For example, various process embodiments disclosed herein can be executed on processor (102), or can be performed across a network such as the Internet, intranet networks, or local area networks, in conjunction with a remote processor that shares a portion of the processing. Throughout this specification "network" refers to any interconnection between computer components including the Internet, Bluetooth, WiFi, 3G, 4G, 4GLTE, GSM, Ethernet, TCP/IP, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, can also be connected to processor (102) through communication interface (116).

An auxiliary I/O device interface, not shown, can be used in conjunction with computer system 100. The auxiliary I/O device interface can include general and customized interfaces that allow the processor (102) to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: flash media such as NAND flash, eMMC, SD, compact flash; magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that can be executed using an interpreter.

The computer/server system shown in FIG. 1 is but an example of a computer system suitable for use with the various embodiments disclosed herein. Other computer systems suitable for such use can include additional or fewer subsystems. In addition, bus (114) is illustrative of any interconnection scheme serving to link the subsystems. Other computer architectures having different configurations of subsystems may also be utilized.

Figure 2:
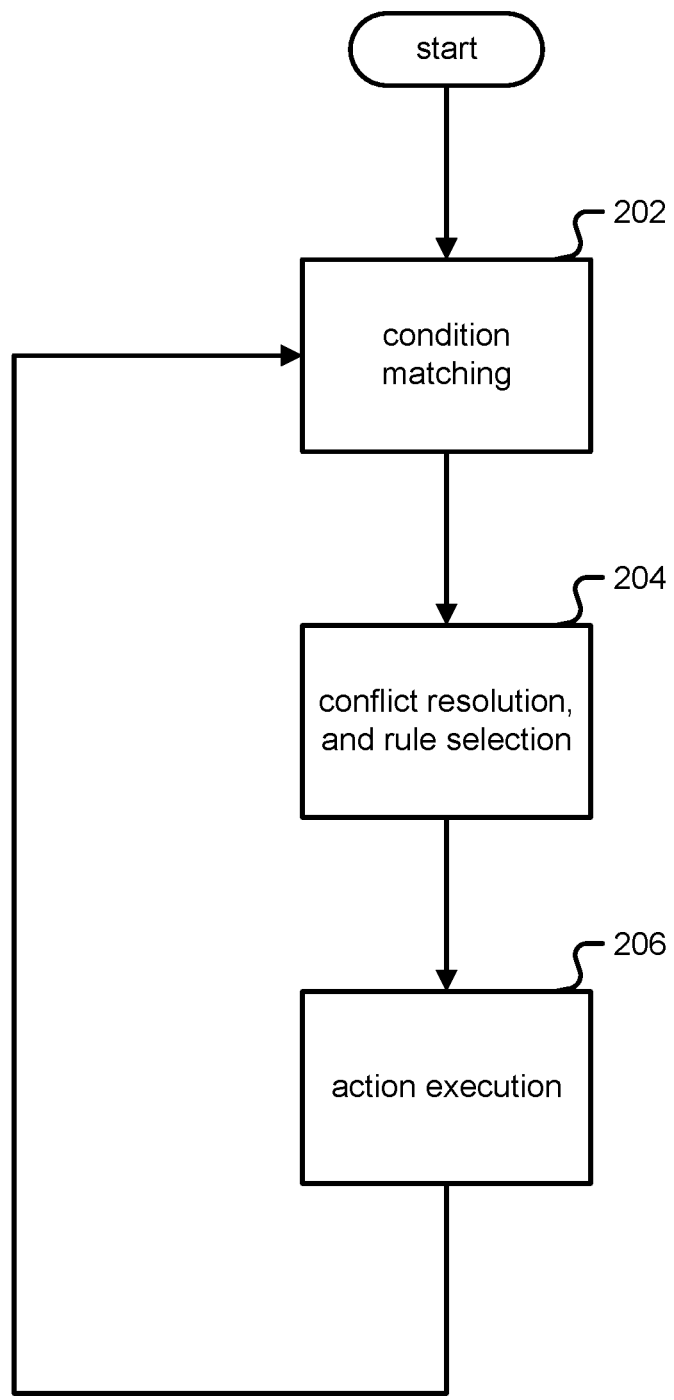
FIG. 2 is a flow chart illustrating an embodiment of a process for traditional complex automated decision making using a rule-based system.

FIG. 2 is a flow chart illustrating an embodiment of a process for traditional complex automated decision making using a rule-based system (RBS). In one embodiment, the flowchart of FIG. 2 is carried out by a system as shown in FIG. 1. In one embodiment, the flowchart of FIG. 2 is a traditional RBS execution flow. When traditional RBS have been used for complex automated decision making, these systems typically structure the rules as "condition:action", where the condition (202) indicates the condition that must be true for this rule to be applied and the action (206) is the processing to take place when the rule is to be applied.

As an example of a traditional RBS, consider a system with four components: a rule base as a type of knowledge base, including a list of rules; a temporary working memory, a user interface, and an inference engine to take action based on an interaction of input and the rule base. In the traditional RBS, this inference engine includes a traditional match-resolve-act cycle to match input to rules, perform conflict-resolution between matched rules, and act on the resolved rules.

For example, in navigation, a rule may be specified as: Condition "if vehicle is approaching a red light" (202) then Action "stop and wait for the light to turn green" (206). That is, it is inferred from the condition being true that the specified action may be performed.

However, in complex applications such as autonomous driving, the rules may end up being far more complex. For instance, it is important to recognize that the vehicle should stop behind any vehicles in front of it, and not proceed on green until the other vehicles have also given it sufficient separation such that it is safe to proceed. Moreover, even if the vehicle is the first car at the intersection, it should not proceed on a green light if the intersection is still blocked by other cars.

In general, traditional RBS may quickly become extremely complex to develop, understand, and maintain, and expensive to execute. In particular, if multiple conditions become true, there is a need for the conflict-resolution strategy (204) that decides which action to perform first. Moreover, once a selected rule has its associated action executed (206), it is possible that one or more of the previous rules whose conditions matched actually no longer match because of the action by the first rule. It is also possible that the conditions associated with other rules now match, for the same reason. Consequently, an RBS needs to re-match on conditions (202) after each rule execution (206). With a complex set of rules and conditions, the conflict resolution (204) and re-matching (202 thru 206) may need to be repeated many times, thus significantly increasing the processing, memory, network and/or resource cost per rule execution. Moreover, these traditional RBS may be "brittle" in the sense that the rules may be too rigid or inadequate in unfamiliar situations.

An RBS approach is attractive however because it avoids the overspecification of order of processing that occurs in imperative procedural programming. Instead, rules are triggered in different orders depending on the conditions that are satisfied over time. In this sense, it is similar to event-driven programming where processing is triggered in response to events, so the order of processing is not pre-specified, but is responsive to the order in which events occur in actual execution of the system or application. An RBS may be viewed as taking this further by having the processing predicated on a general logical condition, rather than on the occurrence of an individual event.

A realistic RBS thus may have a large rule set. For example, in the same self-driving example, the previous example rule only handles a very specific circumstance. For completeness, the rule set may have to include rules for approaching green lights, orange lights, pedestrian crosswalks, traffic cones, policeman directing traffic, ball running out in street, and so on.

In general, the experience with rule-based systems is that the rule set quickly becomes extremely complex and thus difficult to understand, and thus difficult to maintain and extend. For instance, continuing the above example, if an initial rule failed to include the subcondition of waiting if the intersection was not blocked with other cars, the maintainer might need to recognize that this subcondition may be added to every rule's condition in which the vehicle otherwise has the right-of-way. And with manual specification, this subcondition might already be present in one or more of these existing rules, perhaps specified in a slightly different form. Therefore, the maintainer may have to recognize that this other form of the subcondition in the condition or risk incurring extra overhead in rule evaluation by adding redundant logic to the condition.

Moreover, there is a risk of the rule maintainer making a mistake in one or more of these conditions such that the rule fails to match in some condition that it should, or matches in a case in which it should not. Thus, testing may be a significant cost. But also, understanding the logic of a very complex condition and changing it to fix a problem without introducing more may be very challenging.

It may be impractical to manually determine from an arbitrary but complex set of rule conditions whether multiple rule conditions happen to match on the same inputs in cases that are not intended. That is, one or more conditions are under-specified. It also appears infeasible to detect when some input or subcondition is not required to disambiguate a rule condition from the other rule conditions in the rule set. That is, one or more conditions are over-specified.

RBS execution may also become expensive. The execution of an RBS is essentially a repeating loop as illustrated in FIG. 1 of: evaluate rule conditions (202), recording those that are true; select one or more of those rules whose condition is true and/or perform conflict resolution strategy on which action to perform first (204); and execute the action associated with each selected rule (206).

Once a selected rule has its associated action executed, it is possible that one or more of the previous rules whose conditions matched no longer match because of the action by the first rule. It is also possible that the conditions associated with other rules now match, for the same reason. Consequently, a traditional RBS is designed to re-evaluate all the conditions after each rule execution. With a complex set of rules, the conflict resolution and re-evaluation per rule firing significantly increases the cost per rule execution. Moreover, inefficiency from under- or over-specification of rule conditions further adds to the cost.

The rule execution is also inefficient from an overall application standpoint because the RBS is either doing "back propagation in applying rules" to try to achieve some goal or "forward propagation in applying rules" to search for facts that lead to a useful conclusion. Therefore, application end results are only achieved after what is effectively a search through numerous rule applications. This cost is significant with complex rule sets that are required in many applications.

For these reasons, there has been a significant shift away from the use of RBS to so-called machine learning (ML), in which the application "learns" how to recognize a given condition as the output of a feature classification, learning from an extensive labelled training set. For example, a system may be trained on a training set of inputs that correspond to an intersection with a greenlight but cars blocking the interaction, so that the software automatically recognizes this situation. Internally, it is using an artificial neural network with the probabilities or weights associated with nodes being adjusted to produce the correct answer for the instances in the training set.

However, ML-based systems are neither completely predictable nor explainable as to their actions. It is not possible to predict how the system may react to a scenario that is not in its training set. It may not be possible to explain why it did what it did in reaction to a given set of inputs unless the inputs exactly match one instance in the training set. Finally, it has been shown that an attacker may often completely confuse an ML-based system by distorting the inputs slightly. For example, ML systems have been shown to confuse a stop sign for a yield sign after it has been extensively trained on traffic signs, even though the image to a human observer is clearly a stop sign, This example illustrates the dangerous vulnerability of ML in some applications.

Another example of an ML system making a poor decisions demonstrated by several AV/self-driving vehicle accidents in which the system made poor decisions under somewhat confusing circumstances. For instance, in one case, the vehicle sped up just before hitting a guardrail, violating a basic rule of driving, namely: slow down if you are confused about the situation. Similarly, ML-based image recognition has been confused and produced patently false interpretations in some cases when an image is not completely within the training set that it has been trained on.

Automatic generation of a rule set implementation as disclosed is based on and derived from a set of key observations.

A first key observation is that rules may be divided into two categories as referred to herein:

const rules—those that do not generate any external output or external action when triggered; and non-const rules—those that directly cause external output or an external action.

The terms "const" and "non-const" come from C++ nomenclature, referring to whether the rule logically changes state, including external state, or not.

In traditional RBS terminology and implementation, there is an internal working memory. The actions that a rule may take include adding, removing or modifying a fact in this working memory, as well as possibly performing some external action/output. A const rule is a rule that only acts on this working memory. A non-const rule takes some action that is visible outside the rule engine. If a rule set includes a rule that both updates internal working memory as well as generates an external action or output, it may be split into two rules, each with the same condition, with one that does the former, and thus is "const", and the other than just performs the external action, with some indication to the conflict resolution to perform both rules when they match.

A second key observation is that a const rule may be viewed as a logical implication. In particular, a rule is structured as "condition→action". For a const rule the action is simply adding a fact F to the working memory. Thus, the const rule may be regarded as "condition→F". That is, the truth of this condition implies the condition F being true, where the condition F is a Boolean expression that corresponds to the "fact" when it is true. As referred to herein, the term "imply" and "implication" is used in the logical sense that A implies B means that if A is true then B is true.

A third key observation is that the set of "rule conditions" associated with the rule set is the difficult aspect to maintain and to evaluate in execution. This is because the rule conditions may evolve to be quite complex expressions yet the actions are typically quite limited and relatively simple and are often specified as a separate procedure that performs the action. Using the example from above to illustrate, there are a limited number of actions that a vehicle may perform, such as braking, accelerating, and/or turning. It is the condition, such as that outlined previously for proceeding at an intersection, that is complex.

As referred to herein, the term "condition" is conventionally used when it is a condition expression, which when true indicates that the condition is present. The terms "condition" and "subcondition" are used herein in the same way, namely both for the Boolean expression as well as for the state in which this Boolean expression is true.

A fourth key observation is that a rule set may be rewritten to an equivalent rule set such that each rule condition is a conjunction of Boolean subconditions. In particular, if an original rule condition has at the top-level a disjunction, this may be rewritten as multiple rules, one for each subcondition in the disjunction. For instance, if the rule is:

(SC0 || SC1 || SC2)→action3;

it may be rewritten as three rules, namely:

SC0→action3;
    SC1→action3;
    SC2→action3;

Thus, if any of these three original subconditions are true, the action is triggered.

Other conventional Boolean transformations allow each rule condition in the rewritten rule set to be a conjunction. That is, a rule condition may be rewritten as a conjunction of subconditions, for instance:

(SC0 && SC1 && SC2)→action14;

indicating if subconditions SC0, SC1 and SC2 are all true, the scenario with these subconditions/features is the case so the system may perform the action labeled action14.

A fifth key observation is that a rule condition is trying to achieve a matching of facts or inputs to a given scenario in an application-specific model. For instance, in a particular application domain, such as a self-driving vehicle, the rule condition may correspond to seeing a stop sign, and the subconditions are: SC0—red in color, SC1—octagonal shape and SC2—inscribed with "STOP". Thus, the key focus is on specifying each rule condition as recognizing a scenario or scenarios in the application domain that calls for performing the associated action. Stated another way, a non-const rule may be viewed as logically inferring from its rule condition that its associated action is appropriate.

As referred to herein, the term "model" refers to the computer science model which is an object-oriented representation of a system or entity. This usage of "model" distinguishes over using the same term to refer to a mathematical equation-based specification of a system. In particular, object models that specify elements and their relationships are discussed. As used herein, the rule set maintainer (e.g., a system administrator or programmer) may consider adding an additional arbitrary subcondition SC3, that is a Boolean expression. However, in reality, the only subcondition(s) that may make sense to specify are one(s) that aid in matching a given scenario. In conventional terminology, as used with ML and image interpretation, SC0, SC1, SC2 and SC3 are features or represent features of this scenario, used to classify this scenario. They represent a feature in the sense that the subcondition specifies that a given expression in terms of sensor inputs is true of the scenario. For example, the subcondition may be "is approaching intersection".

A subcondition SC3 may be important to add to a rule condition RC0 if this rule condition is ambiguous with respect to another rule. For otherwise, the rule condition RC0 may be under-specified. On the other hand, adding SC3 to RC0 is unnecessary and increases rule condition evaluation cost if RC0 is not ambiguous relative to other rule conditions. That is, adding the SC3 to the rule condition may make it over-specified.

A sixth key observation is that this matching on features or so-called feature classification may be transformed into the problem of root cause analysis by treating features as symptoms and by considering the classes into which features are classified as root causes, that is the root cause for the image that is detected is an object in the image of the corresponding classification. For example, the root cause of the symptoms/features of red, octagonal and inscribed with "STOP" is the object in the image being a stop sign.

More generally, an RBS may be transformed into the problem of root cause analysis by treating:

a) each subcondition of a non-const rule as a symptom;
b) the const rules as symptom propagation. That is, if condition→fact is a const rule, then the "symptom" corresponding to this condition propagates to the "fact", which is also a symptom, that is specified by the rule; and
c) the root cause as a label that is separately mapped to an action to be performed.

Conversely, root cause analysis may be regarded as feature classification in which the features are symptoms and the output classification identifies a particular root cause or root causes. As described above, root cause analysis may also be viewed as a rule-based system in which each action of a non-const rule is "output this root cause" and each const rule is treated as specifying symptom propagation.

A rule set RS, transformed as above, may be embedded in an object model by:

a) for each element mentioned in a subcondition in RS, introducing an element and the corresponding element type, if not already defined, for example a network switch element;
b) for each attribute mentioned in a subcondition in RS, introducing this attribute in the corresponding element type, if not already present. This includes attributes that correspond to relationships between objects. In one embodiment, this is done by manually and/or automatically defining and/or modifying the object-oriented model;
c) for each non-const rule, introducing a corresponding symbolic subcondition in the appropriate element type that is labelled with an indication of the corresponding action, and specified to imply the subconditions that constitute the conjunction which defines this rule condition. Each subcondition is defined in the most relevant element type, that is namely the one in which this subcondition is true of. For example, specifying in a network model, the condition of "cableBreak" in the context of a Link element type. Another example may be a symbolic subcondition of "seeing a stop sign" introducing implications such as "red", "octagonal" and words "STOP";
d) for each const rule, specifying the subcondition implications specified by this const rule. In particular, if this rule is "A→B", specifying implication of subcondition A in its element type to B in either the same element type or a separate element type to which this element type is related in some way; and
e) specifying subconditions that may be determined directly from element attributes as an observable.

FIG. 3 is an illustration of an embodiment of a simple model of a computer network. The model of FIG. 3 is expressed in a object-oriented programming language syntax, illustrating this embedding of rules.

As shown in FIG. 3, there is an element type for each of: Unilink (302), Link (304), Interface (306), and Switch (308), corresponding to the typical components at the physical layer of a computer network. Each element type has a subcondition specified inside its scope. For instance, the Link type (304) has the subcondition named cableBroken. This subcondition also has an actionLabel specified, making it the rule condition for the rule associated with this action-Label.

This subcondition also includes the statement→component::lossOfSignal; meaning that this subcondition implies the subcondition Unilink::lossOfSignal in each Unilink component of Link. In general, in this syntax, the implication statement indicates the relationship followed by the subcondition inferred in the receiving element from this subcondition. The relationship is an attribute of the element, such as, in this example, the Link::component attribute which is an array of Unilink objects.

The Interface element (306) similarly contains a lossOfSignalIn subcondition that is implied by this earlier statement, and then in turn implies this subcondition to its parent Switch (308) as the lossOfSignalIn. The "$" symbol indicates a parameter that is replaced by the name of the element. So, for example, if this interface is eth3, the $ is replaced by eth3 as part of this inference. The lossOfSignalIn subcondition in Switch is indicated as observableBy an expression namely sgnalIn==0. This means that this subcondition may be detected by or equal to an expression in terms of attributes of the type. These attributes are typically set by a monitoring system that is receiving this information as real-time telemetry from the switch. A variable or attribute that appears in an observable subcondition and that may change is referred to herein as an input attribute.

In one embodiment, implication may be instead be specified in the form of inference. For instance,

```
signalLoss : Subcondition {
    <= modem::lossOfSignal;
}
``` specifies that the signalLoss subcondition may be inferred from a lossOfSignal subcondition in the modem that this current element type depends on. This "infer" form is equivalent to an implication specified from the modem to the current element in this example. However, inference is useful in specification because an element is not typically specified with the knowledge of all the elements that depend on it. In this case, the dependent element may specify inference, thereby avoiding this logical compromise in the specification. For example, an invertible relationship may be one between server to client to indicate a propagation of a problem from server to all its clients. Thus, if a client is detecting a problem with the server, it may also be inferred the server has a problem.

Note that the attribute Interface::connectedToBy is indicated as an inverse to the Unilink::connectedTo relationship. In general, every relationship across which a subcondition implication is specified is required to have an inverse relationship. In the case of certain standard relationships, such as component, the inverse is implicit or known, namely parent in this case.

Figure 4:
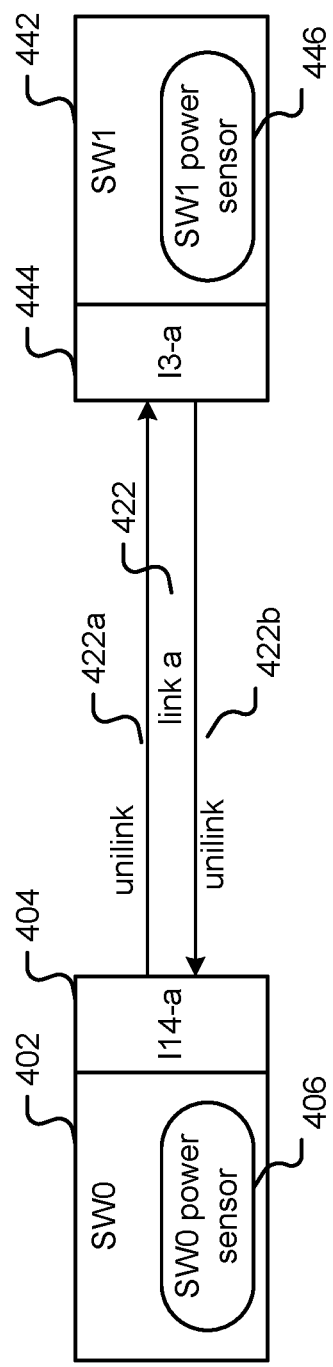
FIG. 4 is an illustration of an embodiment of an instance of a network created with element types.

FIG. 4 is an illustration of an embodiment of an instance of a network created with element types. For example, the element types of FIG. 3 are shown in FIG. 4. In FIG. 4, there are two switches, switch0/SW0 (402) and switch1/SW1 (442), each an instance of the Switch type described earlier. Each switch SW0 (402) and SW1 (442) is shown with one component interface, I14-s/eth14 (404) and I3-a/eth3 (444) respectively, and a power sensor for the switch, SW0 (406) and SW1 (446), respectively. Not shown in FIG. 4 may also be power sensors for the network interfaces (404, 244) if they are discretely powered.

In a real network, there may typically be multiple interfaces per switch and potentially many more switches. The Link (422) between these two connected interfaces is modeled as two component unidirectional links (422a and 422b), each an instance of Unilink. This level of detail allows the directionality of implication to be specified. It also allows for modeling faults such as one direction of a link failing while the other direction continues to function.

This simple model illustrates how a rule condition may be specified in an element type such as a Link (422) on which there may be no telemetry because there are no sensors on a link (422). Nevertheless, the associated subcondition may imply subconditions in intermediate elements such as unidirectional links and then to the connected interfaces to their parent switch, at which point they imply subconditions that are observable.

In one embodiment, the input rule set is specified in a model as illustrated in FIG. 3. Thus, the partitioning into const and non-const rules is just a matter of recognizing that each const rule is specified as an implication from one subcondition to one or more other subconditions for example in the same element or over a relationship to another element, and each non-const rule is specified as the rule condition resulting from the conjunction of the observable subconditions reached by implication from the subcondition labelled with its action.

In the following, the rule set is assumed as either input as embedded in a model as above or else is automatically transformed and embedded into this model as part of the input processing using the algorithm described herein. As referred to herein, "embedding" means specified inside the object model from a physical placement standpoint as shown in FIG. 3. For example, with a unilink element, a subcondition is lossOfSignal, implying that a loss of signal input to an element it connectsTo points at an interface, as shown in the object model in FIG. 3. The object-oriented model in FIG. 3 builds up context and maintains relationships between objects as important.

Automatic root cause analysis (ARCA). Systems may have numerous sources of faults, ranging from equipment failures to computer hardware failures to software failures to operator errors. In complex systems, there are many dependencies between interconnected components. Mechanisms for monitoring systems may also be subject to failure as well. Because of dependencies, the failure of one component may lead to another that indicates a fault condition and/or symptom. Cascading faults may lead to a large number of alerts, making the task of determining a root cause fault quite difficult. As referred to herein, these extra alerts are "symptoms" of the root cause fault.

Traditional approaches to automating root cause analysis have tried to find root causes by looking for statistical correlation between faults, assuming that a strongly correlated fault is the root cause. However, correlation may not indicate causation. Another related statistical approach is to use machine learning techniques to "recognize" different failure scenarios. However, the reliability of this approach is low unless a very large collection of labelled training sets are available which may be expensive and/or impractical.

Automatic root cause analysis (ARCA) using ternary fault scenarios is an alternate technique. A "symptom" is referred to herein as a named and/or defined state of some component of a monitored system that is important to distinguish one fault scenario from another. A "ternary system" as referred to herein may be used for ARCA in part by using a symptom value corresponding to an "unknown" value corresponding to a symptom value that is not known, and a "don't care" value, also referred to as an extraneous value corresponding to a symptom not needed for a particular analysis. In one embodiment, each symptom value is restricted to being one of: true, false, or unknown. Thus, a symptom value is referred to herein as being a "ternary" value. In one embodiment, the unknown and the don't care values are designated by the same value, distinguished as one or the other based on the context of usage.

Ternary Matching and ARCA. In one embodiment, the RBS condition matching is implemented using a ternary system for ARCA. As described above, complex monitored systems may have numerous sources of faults and even the mechanisms for monitoring such a system are subject to failures as well. For example, a temperature sensor monitoring a refrigeration system can fail, either permanently or intermittently, indicating incorrect temperatures for the system being monitored.

Component dependencies may introduce further complexity, for example, the cooling coils in a refrigeration system depend on correct operation of the compressor to provide condensed refrigerant. These dependencies arise from the interconnection of these components. As described above, the failure of one component may lead to another indicating a fault condition/symptom. Consequently, when one component has a fault, it may lead to cascading faults in the components that are dependent on the faulting component, making the task of determining the actual root cause fault difficult. In some cases, the root cause may not even be present among the alerts provided to the operator.

For example, if a cable fails between two computer network switches, there may be a flood of alerts from the switches at either end of the cable. However, there is typically no alert directly indicating the cable break because there are no sensors directly on the cable able to detect a cable breakage. A complex system may also be implemented in multiple layers, creating another set of dependencies. These layer dependencies are another source of alerts. For example, the above cable failure may cause the transport layer to indicate it has sessions timing out because no acknowledgements are being received. Similarly, a misconfiguration at the IP layer may cause alerts at the TCP/transport layer and routing layer to be generated.

Traditionally, these extra alerts are referred to as symptoms of the root cause fault. Generating a large number of these symptoms as alerts makes determining the actual root cause more difficult. Using efficient matching of symptoms without requiring the use of statistical correlation between faults or impractical/costly large training datasets, an efficient way of encoding the principles of operation, the dependencies and causations, and the potential root causes that are known for an engineered system as a result of its engineered design is an improvement on ARCA. This efficiency reduces storage costs and/or decreases power consumption for processors in order to determine root cause analysis. This efficient way allows root cause analysis to be performed automatically and efficiently.

Figure 5A:
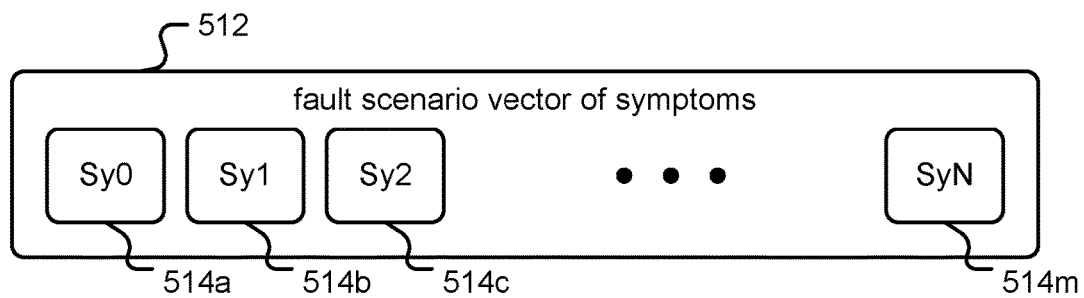
FIG. 5A is an illustration of an embodiment of a fault scenario vector of symptoms.

Symptoms and Fault Scenarios. FIG. 5A is an illustration of an embodiment of a fault scenario vector of symptoms. One example of a symptom, noPower, is a symptom indicating that there is no power coming to the monitored system. The state of a symptom may be a known value or a special indication that it is unknown and/or don't care. The term "don't care" is commonly used in digital logic to indicate that the associated item is extraneous/not required. The ability for the processing to indicate don't care for a given symptom allows analysis to proceed even when that aspect of the state of the system is not actually known.

A "fault scenario" is referred to herein as a collection of symptom values that indicates the known and unknown fault state of a monitored system. Logically a fault scenario represents the state and/or potential partial state of the system from the standpoint of observed/determined symptoms that something is wrong or not wrong with the system. It may not indicate the full state of the system. For example, with a vehicle, the fault scenario may not necessarily indicate the position, velocity, and so forth of the vehicle, only the state of the symptoms, that is, the aspects that are needed to perform root cause analysis of faults.

As shown in FIG. 5A, in one embodiment, a fault scenario is represented as an array of values (512), where each entry (514a-m) corresponds to a specified symptom. For example, symptom Sy0 (514a) is a first entry, symptom Sy1 (514b) is a second entry, and so forth. In one embodiment, there may be multiple symptoms associated with the same metric. For example, there may be different symptoms for a temperature sensor being slightly high, moderately high, and extremely high. In one embodiment, there may be symptoms associated with the same metric based on different levels of derivative. For example, a symptom may be associated with a metric having a first derivative that is zero for too long, that is, it is constant, often indicating that the input sensor has failed. A symptom may be associated with the first derivative being too high, meaning that it is changing too quickly.

There may be additional symptoms associated with a metric that indicate that the metric is out-of-range or behaving incorrectly. In this case, the out-of-range symptom is set at the same time as a symptom indicating the metric is too high or too low, for instance. This "aggregate" form of symptom may allow a fault scenario to be specified in terms of "out of range," rather than having to cover both "too low" and "too high."

A match operator is defined between two fault scenarios s0 and s1 to return true bool isMatching=match(s0,s1);

if every symptom entry in s0 is either don't care or else matches as the value in the corresponding entry in s1. Note that the match operation is not commutative; match(a,b) may not necessarily be equal to match(b,a).

Figure 5B:
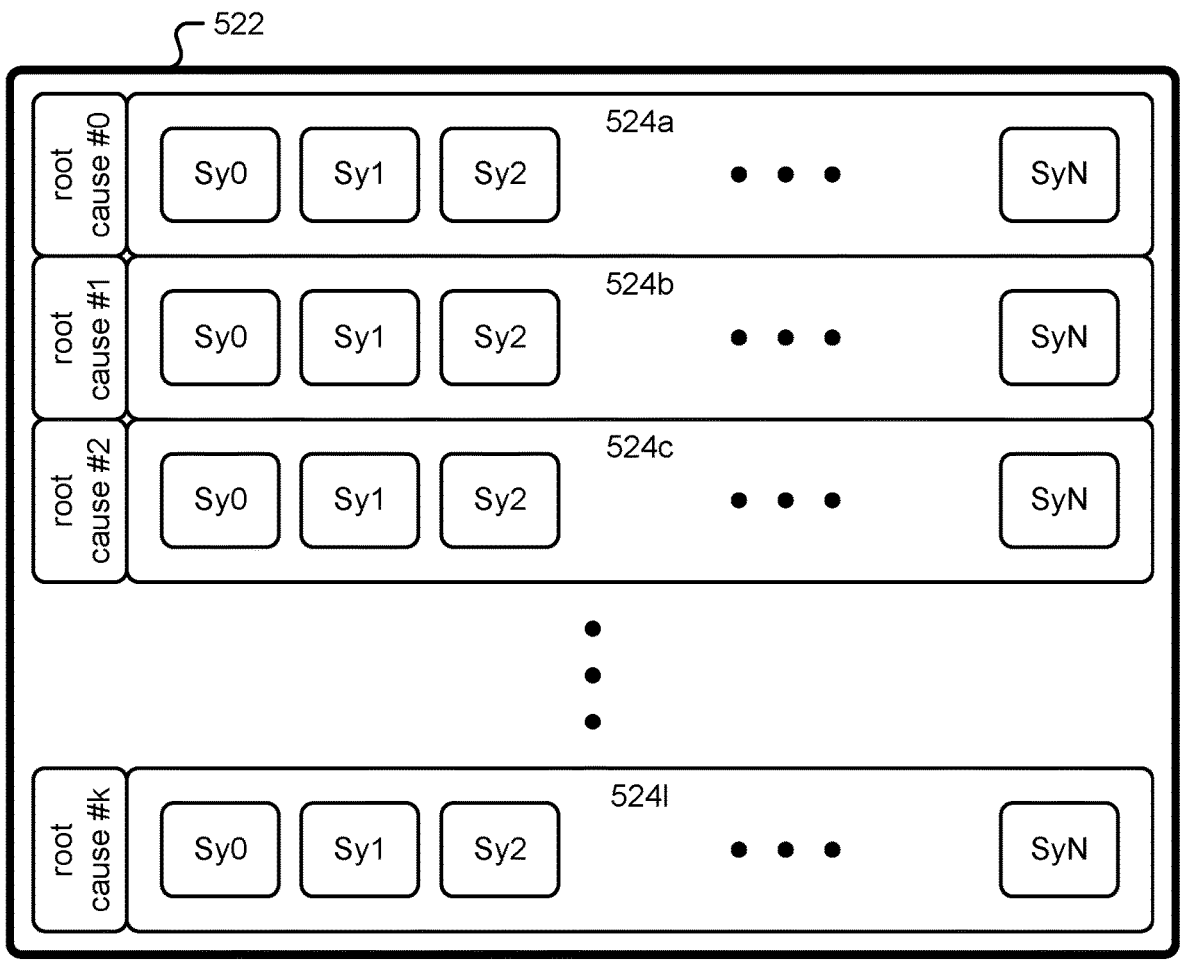
FIG. 5B is an illustration of an embodiment of a root cause table.

Root Cause Table. FIG. 5B is an illustration of an embodiment of a root cause table (RCT). An RCT is a table in which each row is a fault scenario that is labeled with an associated root cause. In this context, an unknown value for symptom in such a fault scenario is interpreted as don't care. For example, for a root cause "bad motor," symptoms in the row may be: noPower as false, motorNotRunning as true, and all other symptoms indicated as don't care.

In one embodiment, an RCT contains a row for every failure or event that can be the root cause, where each row indicates the symptoms that must be true for this to be the root cause, those that must be false, and the rest set as indicating don't care. Note that specifying more symptoms as specific values, rather than don't care beyond the absolute minimal for a given root cause can result in a root cause not being identified or matched because extra symptoms may not be known or are the opposite of that specified for the row. Consequently, it is important to specify the minimal set of known symptoms required to diagnose the system to the particular root cause associated with the row in the table. If a given root cause may have multiple identifying sets of symptoms, there are multiple rows in the RCT, as a row per set. A given root cause may have multiple corresponding rows because one row corresponds to a minimal set of symptoms and others correspond to the minimal set with additional symptoms that provide greater confidence in the root cause. For example, in the case of a power supply failure to a switch, the minimal set may just contain the "lossOfPower" symptom from the switch's current sensor while additional rows may contain that symptom plus "lossOfSignal" symptoms from the directly attached switches to the failed switch.

In one embodiment, each RCT row is represented in the same way as a fault scenario. As such, it may be referred to herein as a "potential fault scenario." As shown in FIG. 5B, an RCT (522) comprises k+1 rows (524a-304l), each row associated with a specific root cause with N symptoms per row. For example, root cause #0 is associated with the first row (524a). The values of the symptoms (204a-m) in each row (524a) are different from the other rows (524b-304l), each corresponding to a potential fault scenario for the associated root cause, as indicated by the root cause labeled #0 through #k.

In contrast to a potential fault scenario, the fault scenario determined from a monitored system is referred to herein as an "actual fault scenario." There may be multiple actual fault scenarios for a monitored system. One actual fault scenario may be a more detailed fault scenario for a particular subsystem compared to another. Another source of multiple actual fault scenarios is uncertainty regarding the faults. For example, one scenario may have a symptom corresponding to the temperature of the system being too low whereas another may have a symptom indicating that the temperature sensor has failed. In the latter case, it may indicate the temperature sensor-dependent symptoms as unknown.

In one embodiment, ternary symptom values are used so that a symptom is represented as a "known" bit indicating known or unknown by being true or false respectively, and a second "value" bit that indicates true or false, which is only interpreted as such if the known bit is set to true. A quaternary nomenclature is referred to herein of [a, b] wherein a is whether a state is known (0=unknown, 1=known) and b is a value associated with the state (0=false, 1=true). With this convention, an interpretation of [0,1] that is allowable is that an associated symptom is not known to be true: Compare [0,0] which may correspond to unknown with [0,1] which may be interpreted as not known to be true. Note that a [0,1] symptom in an entry in an RCT may match to an input being false or unknown unlike [0,0], which corresponds to "don't care" and matches to any value in the corresponding entry in the actual fault vector. Thus [0,1] may not necessarily be treated the same as [0,0] and/or not allowed.

Figure 5C:
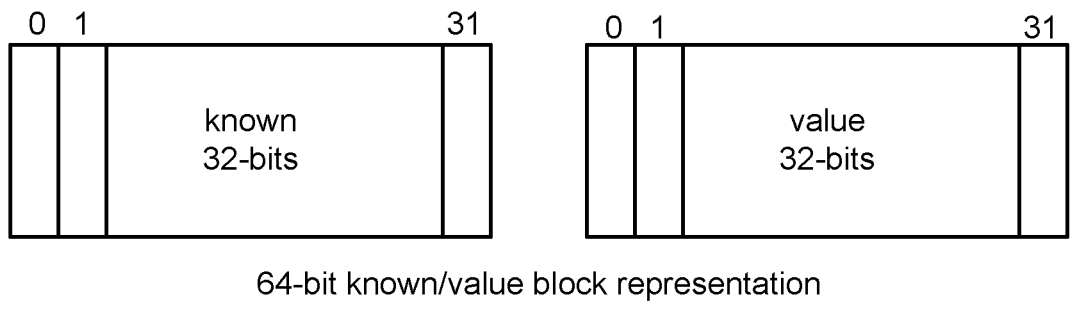
FIG. 5C is an illustration of an embodiment of a 64-bit block representation of known and value bits.

FIG. 5C is an illustration of an embodiment of a 64-bit block representation of known and value bits. In one embodiment, a fault scenario is represented as blocks of bits that are partitioned into a sequence of "known" bits and a sequence of value bits. For example as shown in FIG. 5C, an implementation uses 64-bit blocks, wherein the first 32 bits are "known" bits and the second 32-bits are value bits. Referring to FIG. 5C, if the i-th known bit is 1, the i-th value bit indicates if the corresponding symptom is true or false; otherwise the actual value is not known and the i-th value bit is not meaningful. This embodiment allows efficient determination of the "known" bits in a block. It also means that a block need not be stored if all the symptoms in a block are unknown or don't care. That is, absence of an explicit storage of a block is interpreted as that block containing only "don't care" values.

Figure 5D:
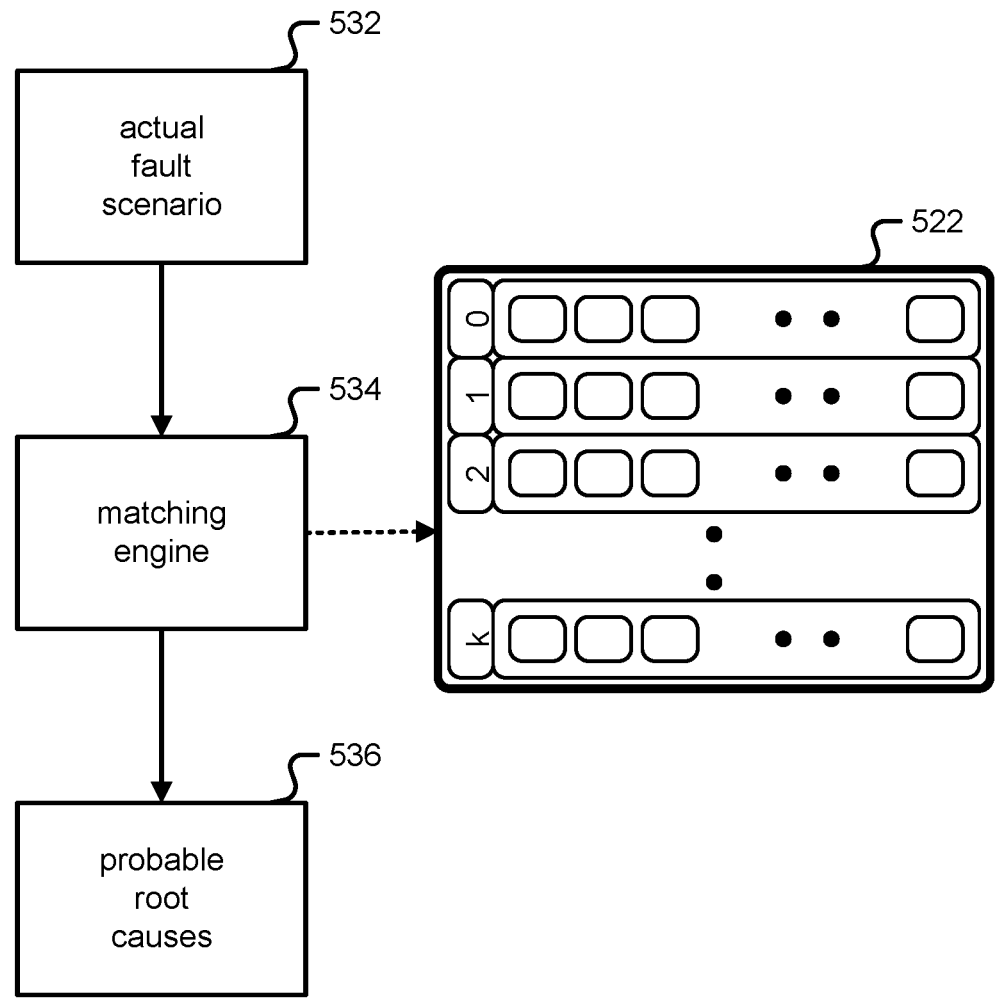
FIG. 5D is an illustration of an embodiment of a root cause analysis technique.

Root Cause Analysis. FIG. 5D is an illustration of an embodiment of a root cause analysis technique. Actual root causes associated with a given actual fault scenario (532) are determined by using a matching engine (534) to match the given actual fault scenario against each row in the RCT (522), and indicating the ones that match as probable root causes. That is, if a fault scenario matches a row such that each entry matches by the above match(a,b) operator, the root cause associated with that row is output as a probable root cause (536) associated with this symptom, as shown in FIG. 5D.

This matching is essentially "ternary matching" but unlike the ternary matching provided by a ternary content-addressable memory (T-CAM), the input fault scenario is also ternary. A T-CAM may however be used as part of an efficient/hardware system of matching. There may be multiple simultaneous root cause failures in a monitored system. Therefore, it is possible that the matching matches multiple rows in the RCT, one per root cause. For example, a motor may fail at the same time that a temperature sensor has failed by indicating completely unrealistic readings. There may be multiple rows that map to the same root cause. This handles the case in which a root cause failure may be indicated by different sets of symptoms.

In one embodiment, the row representation does not explicitly store the don't care entries. That is, the absence of an explicit designation or representation of an i-th symptom is interpreted as don't care for the i-th symptom. In one embodiment, symptoms are aggregated into blocks that are associated with logical units or components of a monitored system. For example, an embodiment may use the 64-bit block of known/value bits described earlier. Thus, if a component is not relevant to a particular root cause, the entire block need not be stored. Each row may then require a relatively small amount of storage. Typically, most rows are relatively sparse because only a small subset of symptoms are relevant to a particular fault so only a small percentage of that row is actually stored, with the rest by default being don't care.

The representation of arbitrary fault criteria is achieved by using multiple symptoms. For example, one root cause is evidenced by a temperature being very high, yet another is evidenced by it being high, and another evidenced by it being slightly high. That is, there may be a symptom entry in each row for each of these levels.

A key element is indicating the symptoms that are known to be false as a symptom, that is no fault, as well as what is known to be true, that is a fault is present, while still allowing for unknown or don't care. The false case effectively filters out symptoms that are due to another reason, for example the compressor is not working, but actually there is no power, which is the root cause. Thus, a subsystem SSi that is dependent on a number of other subsystems may need to have all these other systems known to be working before a fault in subsystem SSi may be reliably identified as a root cause.

Model-based Generation Based on Root Cause Analysis Techniques. Building on the observation of relationship to automatic root cause analysis, there are traditional techniques to automatically generate a root cause table (RCT) from a high-level model of elements, relationships between these elements, symptoms and symptom propagation across these relationships from a root cause to observable symptoms. This approach may also be used with suitable extension to generate a ternary RCT as described above. The ternary matching is important to avoid having to specify subconditions for every input attribute.

In one embodiment, a model is similar to that illustrated in FIG. 3, and similar to the RCT reference instead of a conventional rule set. This model captures the key element or objects of the application domain and their subconditions, also known as features and/or symptoms. For example, in a self-driving application, the model may include vehicles, roads, intersections, driving signs, pedestrians, and so on. The subconditions are expressed in terms of actual inputs to the model such as vehicle-stopped or computed from inputs such as vehicle-over-speedlimit, computed based on the speed limit for the given region of travel and the speed of the vehicle, determined by wheel rotational velocity and possibly positional information. The actions are specified in the model as illustrated in FIG. 3.

In one embodiment, a compiler module automatically translates this model, as an intermediate stage into a collection of directed acyclic graphs (DAGs), each rooted at a subcondition that is the rule condition for a non-const rule. The leaves of each DAG are subconditions expressed in terms of input attributes.

Figure 6A:
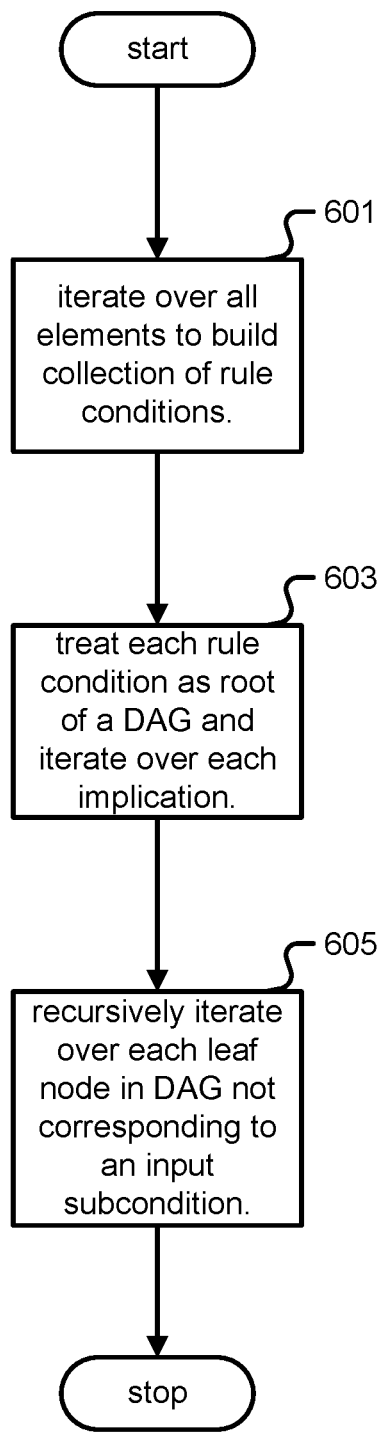
FIG. 6A is an illustration of an embodiment of a process for performing automatic translation.

FIG. 6A is an illustration of an embodiment of a process for performing automatic translation. In step (601), all elements in the model are iterated over to build a collection of rule conditions. In step (603), for each rule condition RC in this collection, the rule condition RC is treated as the root of a DAG and all the implications associated with this rule condition RC are iterated over, adding each link and edge in the DAG for each with the source end corresponding to the rule condition and the destination end corresponding to the target or right-hand side of the implication. In step (605), each leaf node in the DAG that does not correspond to an input subcondition is recursively iterated over, including adding additional nodes and links as in step (603), and terminating when each leaf node corresponds to an input subcondition, and reporting an error if a leaf node does not have an implication that corresponds to an input attribute and does not correspond itself to an input attribute.

Figure 6B:
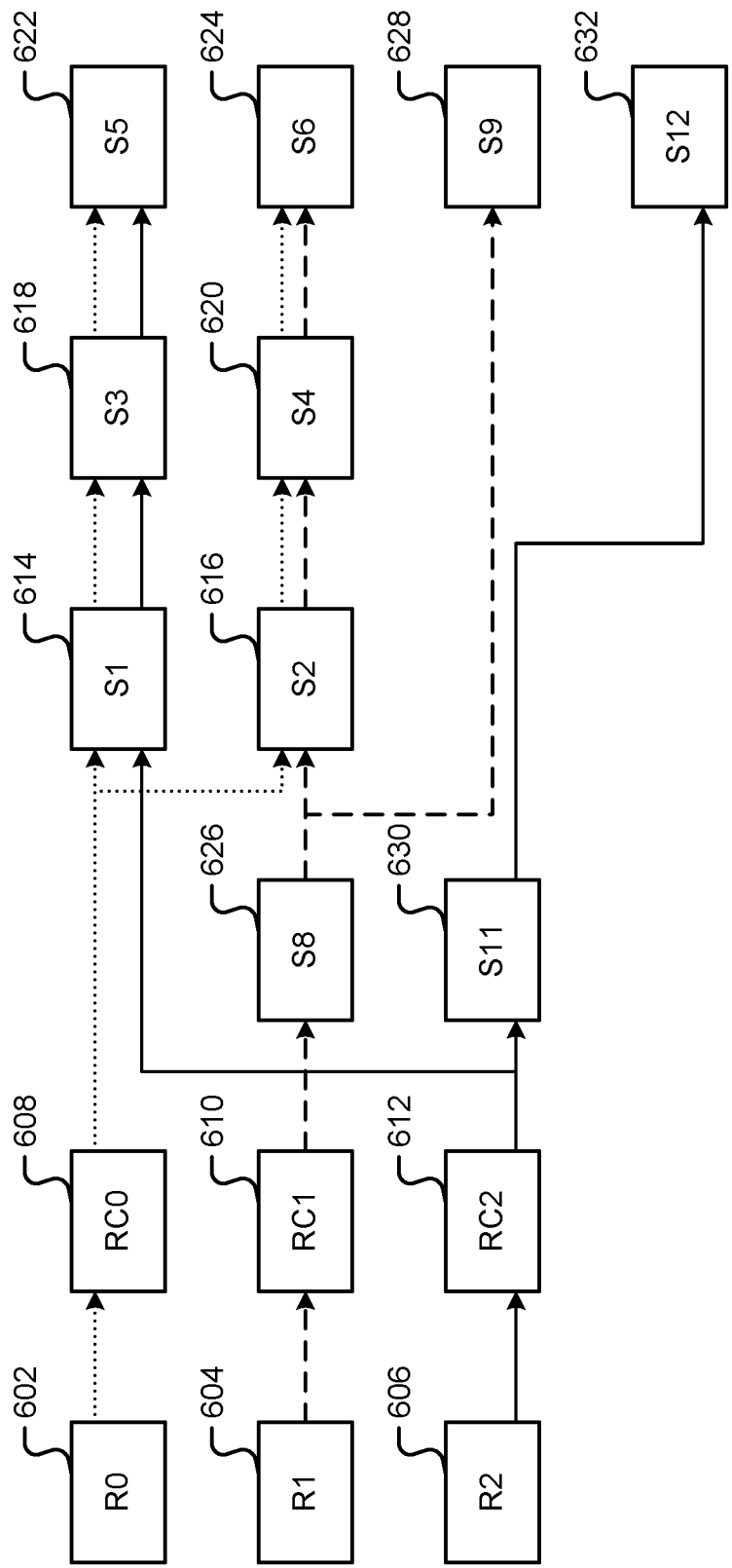
FIG. 6B is an illustration of collection of DAGs for a network example.

FIG. 6B is an illustration of a collection of DAGs for a network example. In FIG. 6B, there are three rules R0 (602), R1 (604), and R2 (606). Each rule has an associated rule condition RC0 (608), RC1 (610), and RC2 (612). Each rule condition implies the truth of one or more subconditions that are the components of this condition as a conjunction. For example, RC0 (608) implies the truth of S1 (614) and S2 (616). S1 (614) implies the truth of subcondition S3 (618) which implies the truth of subcondition S5 (622). S2 (616) implies the truth of subcondition S4 (620) which implies the truth of subcondition S6 (624). Similarly, RC1 (610) implies the truth of S8 (626), which in turn implies the truth of both S2 (616) and S9 (628). Similarly, RC2 (612) implies the truth of both S1 (614) and S11 (630). S11 (630) implies the truth of S12 (632). Put another way, DAGs are derived to reflect implications.

In the network context illustrated in FIG. 4:

RC0 is bi-directional link is broken, so S1 and S2 represent Unilink loss of signal. S3 and S4 are lossOfSignal at two connected interfaces, and S5 and S6 are indicators in switch for each interface which is observable; RC1 is a loose interface which implies S8, loss of power to Interface. S2 is lossOfSignal on a Link. S9 is noInterface at the switch level which is observable; and RC2 is another loose interface which implies S11, loss of power to Interface. S1 is lossOfSignal on a Link. S12 is noInterface at the switch level which is observable.

In one embodiment, the compiler outputs a table in which there is a row Ri for each rule condition RCi and a column for each input subcondition Ij. The j-th entry in row Ri is set to true if input subcondition Ij occurs as a leaf of the DAG corresponding to RCi. It is set to false if the input subcondition Ij occurs as a negated leaf of this DAG. In the case of a ternary representation, it is set to "don't care" if there is no leaf node corresponding to Ij in this DAG. The embodiment also includes a matching mechanism that computes the input subconditions and matches them against the rows in the table, outputting the action label for each row that matches, enabling the action associated with this matched rule to be executed.

In one embodiment, the compiler outputs explicit condition checking code that, when invoked, evaluates the rule conditions with the rules in the rule set. In this case, it generates an "if" statement whose condition is the conjunction of the subconditions that are the leaves of the DAG associated with a non-const rule, that is its input subconditions. For example, considering FIG. 6B, for RC0 (608), the compiler generates code to check the rule condition as:

if (S5 and S6) then perform action for R0;

One interpretation of this model is essentially the example shown in FIG. 6B: R0 (602) corresponds to the action to take when a cable is broken in an interface. Thus RC0 (608) corresponds to "cable is broken". This condition implies a loss of signal on both uni-directional channels of that cable, corresponding to subconditions S1 (614) and S2 (616). Each of these subconditions then implies subconditions on the attached interfaces of loss of signal, corresponding to subconditions S3 (618) and S4 (620). Each of these subconditions then implies the subconditions on the associated switches, namely S5 (622) and S6 (624), which correspond to telemetry values being reported by the two switches indicating loss of signal on each of these interfaces.

In one embodiment, this processing is an adaptation of other works such as ARCA works, by replacing "symptom" with "subcondition" and replacing the root cause designation with an action designation. Considering the self-driving application again, the rule "remain stopped on entering intersection at a green light because of blocked" has a rule condition in the element AV (for autonomous vehicle) that implies in the traffic light detector the subcondition "isGreen" and implies in the intersection detector the subcondition "isEntering", and implies in the obstacle detector the subcondition "IsBlocked". The rule condition is then generated as the conjunction of these the subconditions being true. In C++-like pseudo-code, the generated rule may be specified as:

```
if((trafficLightDetector->color( )==green) &&
   (intersectionDetector->position( )==entering)&&
   (obstacleDector( )->state( )==blocked))   {
   remainStoppedEnteringGreenBlockedIntersection( );
}
```

This generation is based on the observation that a row of a RCT is specifying the root cause as the conjunction of observable/observable symptoms, so by the above translation, the condition for a rule is the conjunction of the corresponding input subconditions. Thus, Table 1 is an RCT representing the DAGs of FIG. 6B:

TABLE 1

Root Cause Table for Example in FIG. 6B.

| Root Cause | Symptom S5 | Symptom S6 | Symptom S9 | Symptom S12 |
|---|---|---|---|---|
| RC0 | 1 | 1 | x | x |
| RC1 | x | 1 | 1 | x |
| RC2 | 1 | x | x | 1 |

Separating Actions from Condition Evaluation. In one embodiment, the action for a non-const rule is specified indirectly by specifying a scenario label or an action label in the model in place of the root cause name, and providing a separate mapping of scenario label to action. In this embodiment, using the above example again, the rule may be:

```
if((trafficLightDetector->color( )==green) &&
   (intersectionDetector->position( )==entering)&&
   (obstacleDetector( )->state( )==blocked))   {
   output("enteringGreenBlockedIntersection");   }
``` so the label is "enteringGreenBlockedIntersection".

After the rule evaluation is performed, the label that is output is matched to the associated action. In this case, the actionMap may map to the action "remainStopped". In C++-like pseudo code, one realization may be:

```
actionObject = actionMap("enteringGreenBlockedIntersection");
actionObject->performAction( );
``` where the "actionObject" is a C++ object that has a virtual function performAction that is overridden in each derived type of this object to perform the desired action.

In this case, the actionMap may map to an object of a derived type that overrides the performAction procedure to perform the action of "remainStopped". This indirection means the matching identifies the scenario with a label, and scenario is mapped to the action. Consequently, the same action implementation may be shared across multiple scenarios. In fact, this example may be refined by having a "comeToStop" action, which may be applied in many different scenarios which do not necessarily involve intersections, traffic lights or blockage. For example, there may be a roadworker holding up a stop indicator prior to some construction that narrows the road to one lane. The same action may be invoked in this scenario as well as many others.

For clarity of explanation, the action mapping is shown as a textual label mapping. However, in internal implementation, the label may be a pointer to the associated action object, so the mapping is essentially just a virtual function call in C++ terminology.

For simplicity of explanation, the performAction function is shown without any parameters. However, in one embodiment, there may be a "scenario" object that is associated with the matched scenario that is passed to the performAction function, that is actionObject->performAction (scenario); where "scenario" is a description of the scenario. For example, the "comeToStop" action needs to be parameterized on the distance to the blockage as well as the speed of the vehicle. This extra information may allow the action procedure to determine whether it needs to brake hard or whether gradual braking is sufficient.

Thus, a compiled result from FIG. 6B includes a table that is matched against to perform rule condition evaluation and/or generated code that explicitly evaluates the rule conditions. In one embodiment, the generated code is parameterized in terms of the elements and inputs involved in the rule conditions. Thus a compiled result may be a table which tends to an automatic poll driven, memory intensive operation, say being polled every five minutes. A complied result may also or alternately be generated code which tends to an interrupt and/or symptom driven codebase that parameterizes code via code generation, and may be triggered by symptoms, for example.

To perform conflict resolution, as is traditionally specified in an RBS, one embodiment creates a matchset of matched action labels as a result of condition evaluation. Then, if there are multiple entries in this set, indicating multiple rules are being triggered, it applies conflict resolution to this set to select the subset of actions to perform. Considerable other references exist on techniques to select actions, including priority, time matched, and based at least in part on probabilities as described herein.

Action Selection based on Probability. A traditional approach, used with Bayesian networks and machine learning, is to associate probabilities with the inputs, and pass these probabilities through a computational network to compute the output with the highest probability. For example, a temperature sensor may be considered over threshold with some probability P and under threshold by the complement probability 1-P, where P reflects the uncertainty that the sensor is not reporting the current temperature.

There are several problems in associating probabilities with inputs.

First, these input probabilities are not known and perhaps not practically knowable, given they may depend on many factors, including the age of the component, the way it was installed and the make/model of the component. This is particularly problematic in ARCA due to reasonably infrequent failure events. For example, it may be infeasible to have data on how frequently a given make and model of temperature sensor fails such that it reports an incorrect temperature crosses the threshold for that set for a particular system, given this event may only be detected by having one or more redundant temperature sensors with which to compare the normal or in-service temperature sensor. That is, it would require a second monitoring device per sensor and record the frequency with which is discrepancy arose, an expensive redundancy not done often in practice.

Second, different inputs are often not completely independent because there may often be a dependence or correlation between different inputs given they are part of the same system under diagnosis. This dependence could be expressed in probabilities as a conditional probability between two inputs. However, such a conditional probability is even more difficult to know, given it involves samples across a pair of elements. Moreover, the actual conditional probability may vary over time and/or space based on various factors, including the actual values of the different sensor values, the age of the system, its mode of operation and so on.

Finally, the output of such systems is generally provided as the root cause with the highest probability, as computed from these input probabilities, and thus is a single root cause, given only one may have the highest probability. In fact, these probabilistic computations may generate a large number of potential diagnoses, and rank them by probability. However, it is not clear how to filter these diagnoses sensibly based on computed probabilities, given the difficulties with using input probabilities mentioned earlier. For instance, if the operator only considers potential root causes with probability greater than 0.7, a reasonable concern is to ask how a user may have confidence that the actual root cause has at least that probability. That is, how may a user reason that this particular threshold is the right one to include the actual root cause without arbitrary numbers or requiring repetition to gain a manual, qualitative intuition for the system.

A manual approach to root cause analysis traditionally uses qualitative evaluation of symptoms and human "common sense" so is not very adaptable to an automated root cause analysis system. Similarly, these manual "by hand" approaches lack a computational framework for dealing with uncertainty, further making them difficult to automate.

An example of a traditional ARCA is DellEMC's SMARTS program, which may apply probabilities on input. It does not appear to generate multiple root cause matches, when it may use the closest match based on Hamming distance. The use of a Hamming distance would typically give only one top match except for ties. Given the use of a Hamming distance as an arbitrary measure, it is not necessarily clear what semantics or value to attach in relativity to the second-closest match, third closest match, and so on.

An efficient automated means to generate a set of likely root cause failures that correspond to the symptoms of the system under diagnosis is shown herein, including by specifying and/or pre-specifying a multiplicity of potential fault scenarios. As referred to herein, a potential fault scenario may correspond to a set of symptoms that are expected when a given fault in the system occurs. As referred to herein, a symptom is an observable value or value range, or value computable from observable values relevant to identifying a fault or counter-indicative to a fault. Unlike SMARTS which may apply probabilities on input, the techniques herein associate probabilities with output, expressed for example as confidence levels. As referred to herein, a confidence level for a potential fault scenario is the probability for the scenario fault in the system given the set of symptoms of the potential fault scenario.

For example, a symptom may be "loss of signal" being reported by a computer network switch on a particular one of its interfaces. When the monitoring of the system detects a set of symptoms from the actual system being monitored, referred to herein as an actual fault scenario, this actual fault scenario is matched against the set of potential fault scenarios, to produce what is referred to herein as a matchset for this actual fault scenario, with a potential fault scenario being a member of a matchset if it is matched to the actual fault scenario.

This matchset may then be refined based on attributes of the matching potential fault scenarios and other information. As referred to herein, attributes include any information and/or relationships related to the matching potential fault scenarios such as relationships between symptoms of matches, identity of matches, and/or confidence levels of matches. The root cause faults associated with the entries in the refined matchset may then be output, constituting the result of the root cause analysis. This root cause analysis may produce a set of potential root causes that likely will include the actual root cause fault or root cause faults.

Network Example—multiple potential fault scenario. An example based on FIG. 4 is a symptom of the current symptoms for a network is "loss of signal" being reported by a computer network switch on a particular one of its interfaces.

The actual fault scenario of a "loss of signal" being reported by SW0 (402) on interface I1-a (404) may match to a fault scenario FS1 corresponding to there being a link failure in link a (422) between switch SW0 (402) and switch SW1 (442). However, the same symptoms may also match to a fault scenario FS2 in which the two interfaces (404, 444) at either end of the link have failed at the same time. It may also match to a fault scenario FS3 corresponding to the link failure in link a (422), but without ancillary symptoms considered, such as the symptoms corresponding to power loss at SW0 sensor (406) and SW1 sensor (446) being known to be false. Consequently, in this example, the matchset consists of FS1, FS2 and FS3. A tabular expression of this is:

| Label/Metadata | Symptoms | Root Cause |
|---|---|---|
| FS1 | Loss of signal on (404) & no power loss at (406) & no power loss at (446). | Link a (422) failure |
| FS2 | Loss of signal on (404) & no power loss at (406) & no power loss at (446). | Both interfaces (402, 444) failed at same time. |
| FS3 | Loss of signal on (404). | Link a (422) failure |

Subsuming base scenarios by their associated derived scenarios. In one embodiment, an attribute of a potential fault scenario indicates when one potential fault scenario FSa is subsumed by another potential fault scenario FSb. That is, whenever FSb is matched, FSa would also be matched. As referred to herein, FSa is a base scenario and FSb is a derived scenario. In the case that both FSa and FSb are matched, a refinement of the matchset is to remove FSa from the matchset before translating the fault scenarios to their associated root causes.

To illustrate this case, the match refinement step would recognize, continuing the Network Example of FIG. 4, that FS3 is subsumed by FS1 because FS3 is requiring matching only a subset of the symptoms that FS1 is requiring.

| Label/Metadata | Symptoms | Root Cause Identifier |
|---|---|---|
| FS1 (derived scenario) | Loss of signal on (404) & no power loss at (406) & no power loss at (446). | Link a (422) failure |
| FS2 | Loss of signal on (404) & no power loss at (406) & no power loss at (446). | Both interfaces (402, 444) failed at same time. |
| ~~FS3~~ (base scenario subsumed by FS1) | ~~Loss of signal on (404).~~ | ~~Link a (422) failure~~ |

Another simple example of a base scenario being subsumed by a derived scenario is a medical example:
 a potential fault scenario FSm shows a root cause of flu given the symptoms of high body temperature and aches with an 80% confidence level; and
 a potential fault scenario FSn shows a root cause of flu given the symptoms of high body temperature, aches, and headache with a 90% confidence level.

| Label/Metadata | Symptoms | Root Cause Identifier | Confidence Level |
|---|---|---|---|
| FSm (base scenario) | High body temperature & aches | Flu | 80% |
| FSn (derived scenario) | High body temperature & aches & headache. | Flu | 90% |

Thus, with an actual fault scenario including symptoms of high body temperature, aches, and headache, FSm is recognized as a base scenario subsumed by a derived scenario, FSn, and thus a root cause of flu with a 90% confidence level is output.

| Label/Metadata | Symptoms | Root Cause Identifier | Confidence Level |
|---|---|---|---|
| ~~FSm (base scenario)~~ Subsumed by FSn | ~~High body temperature & aches~~ | ~~Flu~~ | ~~80%~~ |
| FSn (derived scenario) | High body temperature & aches & headache. | Flu | 90% |

Combination of output probabilities. In one embodiment, a refinement may recognize that two potential fault scenarios that are present in the matchset are actually two different set of symptoms for the same root cause, and in fact may both be true, so the output contains that potential root cause, possibly with an associated probability that is a combination of the probabilities of the two potential fault scenarios. For example, FSn may be a potential fault scenario showing a root cause of flu given symptoms of high body temperature, aches, and headache with a 90% confidence level and FSp may be a potential fault scenario showing a root cause of flu given symptoms of runny nose and ear aches with a 5% confidence level.

| Label/Metadata | Symptoms | Root Cause Identifier | Confidence Level |
|---|---|---|---|
| FSn | High body temperature & aches & headache. | Flu | 90% |
| FSp | Runny nose & ear aches. | Flu | 5% |

A patient with symptoms of high body temperature, aches, headache, runny nose, and ear aches may be recognized as a combination with an associated probability being a combination of the 90% confidence level and 5% confidence level. In one embodiment, the confidence levels may be linearly summed.

| Label/Metadata | Symptoms | Root Cause Identifier | Confidence Level |
|---|---|---|---|
| FSn | High body temperature & aches & headache. | Flu | 90% |
| FSp | Runny nose & ear aches. | Flu | 5% |
| Combination (FSn, FSp) | High body temperature & aches & headache & runny nose & ear aches. | Flu | 95% |

Alternative explanations. In one embodiment, an attribute of a potential fault scenario indicates when one potential fault scenario FSc is an alternative possibility to another potential fault scenario FSd. Thus, when both FSc and FSd occur in the matchset, the refinement would indicate these as part of a subset of alternative potential root causes for the actual fault scenario, as opposed to indicating the two matches as two separate possible faults and/or indicating the two matches as part of different root cause groups. In an embodiment, the attribute indicating a potential root cause as an alternative can be computed by comparing the symptoms of the two potential root causes. It is an alternative has a subset of the symptoms of the other potential root cause and it is not a base root cause of same, it is an alternative.

For example, using the Network Example of FIG. 4, refinement would indicate FS1 and FS2 as alternatives to each other, given that both scenarios correspond to a common set or subset of symptoms.

| Label/Metadata | Symptoms | Root Cause Identifier |
|---|---|---|
| FS1 (derived scenario) | Loss of signal on (404) & no power loss at (406) & no power loss at (446). | Link a (422) failure |
| FS2 (alternative explanation to FS1) | Loss of signal on (404) & no power loss at (406) & no power loss at (446). | Both interfaces (402, 444) failed at same time. |

Another simple example of an alternative explanation is a medical example:
a potential fault scenario FSn shows a root cause of flu given the symptoms of high body temperature, aches, and headache with a 90% confidence level; and
a potential fault scenario FSq shows a root cause of hayfever given symptoms of high body temperature, aches, and headache with a 3% confidence level;

| Label/Metadata | Symptoms | Root Cause Identifier | Confidence Level |
|---|---|---|---|
| FSn | High body temperature & aches & headache. | Flu | 90% |
| FSq | High body temperature & aches & headache. | Hayfever | 3% |

Thus with an actual fault scenario including symptoms of high body temperature, aches, and headache, FSq is recognized as an alternative explanation to FSn.

| Label/Metadata | Symptoms | Root Cause Identifier | Confidence Level |
|---|---|---|---|
| FSn | High body temperature & aches & headache. | Flu | 90% |
| FSq (alternative explanation to FSn) | High body temperature & aches & headache. | Hayfever | 3% |

In one embodiment, another attribute of a potential fault scenario is the probability of this fault scenario relative to its associated alternative fault scenarios. To illustrate, using the Network Example of FIG. 4, the probability of FS1 may be 0.95 and the probability of FS2 as an alternative to FS1 may be assigned 0.05. The matchset refinement may then order the associated root causes according to the probabilities associated with each of the alternatives. Thus, in the Network Example of FIG. 4, the refined root cause set may be:
[RC1:0.95, RC2:0.05]

wherein RC1 corresponds to the root cause associated with fault scenario FS1 and RC2 corresponds to the root cause associated with fault scenario FS2. The refinement eliminates a third entry because FS3 is subsumed by FS1.

| Label/Metadata | Symptoms | Root Cause Identifier | Confidence Level |
|---|---|---|---|
| FS1 (derived scenario) | Loss of signal on (404) & no power loss at (406) & no power loss at (446). | Link a (422) failure | 95% |
| FS2 (alternative explanation to FS1) | Loss of signal on (404) & no power loss at (406) & no power loss at (446). | Both interfaces (402, 444) failed at same time. | 5% |

Associating probabilities with the potential fault scenarios may be more feasible than the input probabilities approach because each fault scenario represents a situation in which a top-level failure requires remediation. Therefore, operational data may indicate the frequency with which a given root cause occurred compared to that of the alternatives, namely those with the same symptoms. For example, resuming Network Example of FIG. 4, if a broken link a (422) is the actual root cause 95 out of 100 times that the associated symptoms were observed, and only 5 out of those 100 times was it the case that it was actually the two interfaces (404, 444) failing at the same time, recorded operational data provides the basis of weighting and ordering these two alternative root causes with these probabilities.

Therefore, remedial action that first treats the output result as detecting a broken link a (422) would immediately address the actual root cause failure most of the time, and only 5 percent of the time, would require going to the alternative fault remedial action. In some cases, such as the case of simultaneous failure of two interfaces (404, 444), a user may estimate the probability based mean time to repair for an interface and the frequency of an individual interface failing and the number of interfaces, further qualifying with the likelihood that two interfaces failing within the same recovery window are actually on either ends of a link. Note that it is possible, although unlikely, that both the link has failed and the two interfaces have failed. That is, the alternative root causes may not be mutually exclusive. In this case, remedial actions for both faults are required.

Matching. In one embodiment, the matching of an actual fault scenario to potential fault scenario, as performed by a matching mechanism, is exact in the sense that each matched potential fault scenario may be required to be such that the actual fault scenario satisfies for each symptom the symptom requirement specified in the matched potential fault scenario.

For example, if the potential fault scenario specifies a symptom Si to be the temperature of an oven being greater than 100 Celsius, the actual fault scenario should include this symptom being reported as greater than 100 Celsius.

This matching contrasts with the input probability approach used for example, in SMARTS, in which there is some probability that the symptom is true, even if the sensor is not reporting this, given the uncertainty about the sensor as captured by the associated probability. It also contrasts with the various seemingly arbitrary "distance-based" approaches such as the Hamming distance approach, in which the ARCA system is selecting a "best match" based on the distance by some metric between the actual symptoms and the symptoms associated with a root cause, analogous to a potential fault scenario. In one embodiment, generation of the matchset is performed by a ternary matching mechanism as described herein with the ternary RCT representation.

The unrefined fault scenario matchset may include multiple members even with matching a single actual fault in part because the set of potential fault scenarios should cover the cases in which some telemetry is missing or wrong. For example, FS3 in the Network Example above is provided so that there is some match even if telemetry for ancillary symptoms is not complete or incorrect. That is, it would be unacceptable to not be able to diagnose a link failure in link a (422) just because one (402) or the other of the switches (442) was unable to report on power (406, 446) to an interface.

In general, matching may be efficient to implement and able to match multiple independent root causes simultaneously as described in the above application regarding ternary fault scenario representation. Matching has the disadvantage that it fails to match when any specified symptom in the potential fault scenario that corresponds to the actual fault scenario does not match the symptoms determined from the telemetry. This may arise even when a human evaluation of the symptoms might quickly conclude what the root cause is.

Figure 7:
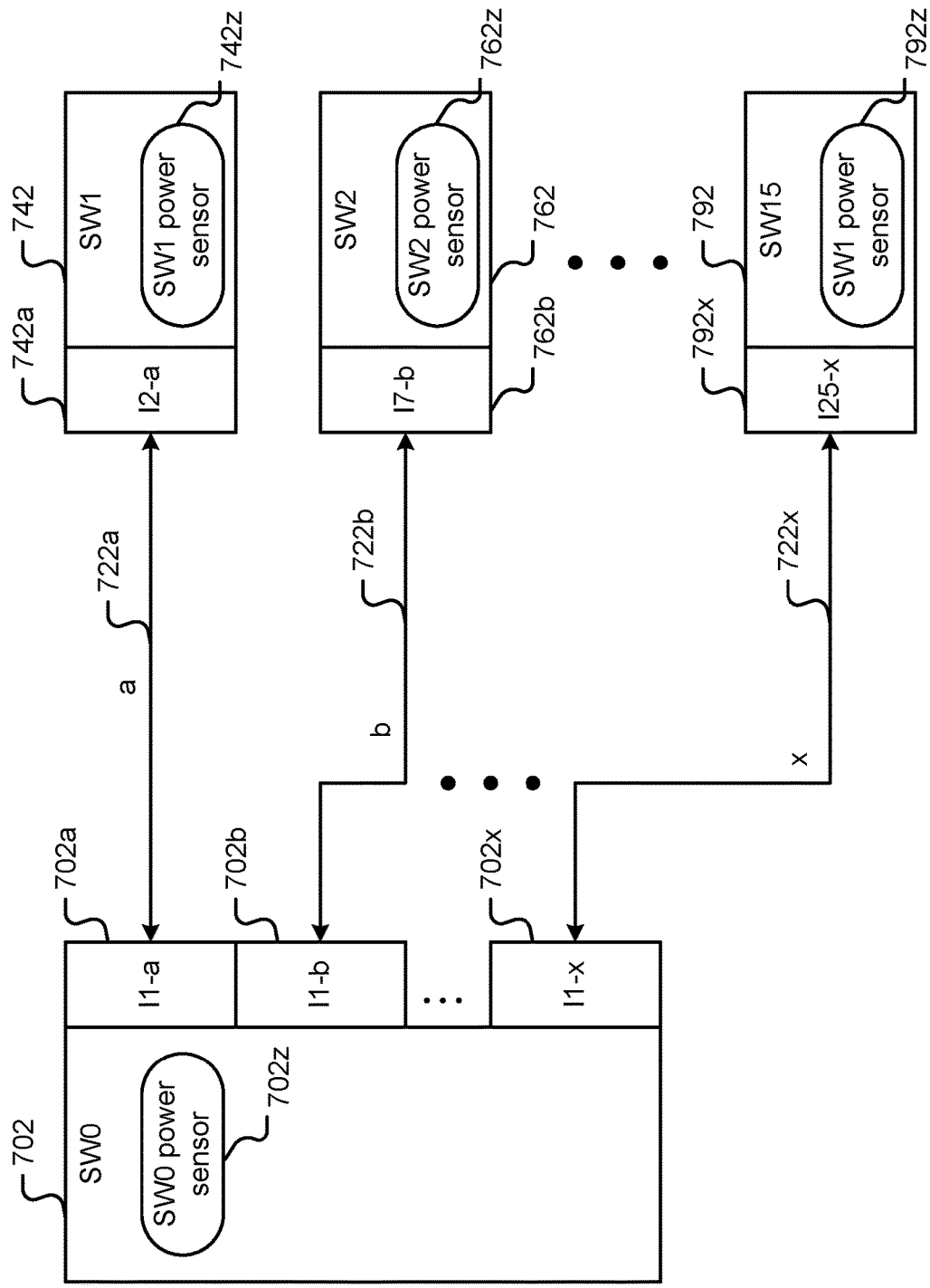
FIG. 7 is a block diagram illustrating an embodiment of a power example.

FIG. 7 is a block diagram illustrating an embodiment of a power example. In this Power Example, a switch SW0 (702) is fully coupled via interfaces and links to 24 other switches SW1 (742), SW2 (762) through SW15 (792). As shown before in FIG. 4, each switch for example switch SW0 (702) comprises a power sensor (702z) as well as one or more interfaces I1-a (702a), I1-b (702b), . . . , I1-x (702x) each corresponding to a link a (722a), b (722b), . . . , x (722x).

If the power to a computer network switch SW0 (702) including SW0 power sensor (702z) fails, one would expect that each interface to which the switch is connected over a link would detect a loss of signal. However, if the switch in question is connected over links to 24 separate interfaces I2-a (742a), I3-b (762b), . . . I25-x (792x), but only 23 of these interfaces are reporting loss of signal and a 24th one I25-x (792x) is missing from the telemetry, matching would fail matching to a potential fault scenario that specified all 24 separate interfaces having the symptom loss of power—even though any reasonable person may conclude from the symptoms that the switch had failed, and furthermore failed due to lack of power if that switch SW0 power sensor (702z) reported loss of power.

As shown herein, leveraging the ability of such matching to match to multiple fault scenarios at the same time in order to compensate for this disadvantage is important. In particular, besides having a potential fault scenario that corresponds to all the symptoms, there are potential fault scenarios specified that correspond to partial matches for the same root cause. The extension to associated attributes with potential fault scenarios allows a refinement of the matchset to reduce number of potential root causes that are actually output.

In particular, when a match to the full potential fault scenario occurs, the potential fault scenarios corresponding to partial matches of the same root cause are eliminated and/or subsumed. Similarly, the probability attribute associated with a potential fault scenario allows the output to efficiently indicate a lower confidence for a root cause in the output when it is present only because of what is effectively a partial match.

In one embodiment, another technique for allowing partial matches is termed "approximate matching" and is used for a case in which not all features, for example subconditions, are necessarily known. Approximate matching can thus be used in conjunction with partial matching.

In one embodiment, approximate matching is provided by specifying a distance threshold parameter and outputting rows as matching if they are within the distance threshold according some distance metric defined between a row and the mask. Processing extra matches to reduce and organize matches for efficiency in interpretation may be improved by approximate matching in part by treating an approximate match at distance D, for example, as a base root cause relative to a match at distance D−1.

Partial-Match Potential Fault Scenarios (PMPFSs). A PMPFS is referred to herein as a potential fault scenario added to effectively handle partial matches with a matching mechanism. There are various techniques to define PMPFSs.

A PMPFS that omits one symptom. First, for each full potential fault scenario for a root cause, there may be for each symptom a PMPFS that omits one of the symptoms. For example, using the Power Example of FIG. 7, there may be a PMPFS for each neighboring interface which omits this interface as a symptom or alternately designates this symptom as a "don't care". For example, a PMPFS may omit I25-x (792x) as a "don't care" and thus with I2-a (742a), I3-b (762b), . . . , I24-w (not shown in FIG. 7) reporting a loss of signal, the system may conclude the switch SW0 (702) has failed.

It may be possible to go further and provide a PMPFS for a subset of symptoms of the full potential fault scenario. For example, create a PMPFS for both I24-w and I25-x (792x) as "don't care". However, that may lead to an impractical number of PMPFSs in systems of realistic complexity. For example, in the example of a switch with 32 direct neighbor switches, there are basically 2 to the power of 32 or roughly 4 billion possible subsets. Here, approximate matching may solve the issue with excessive number of PMPFS. Put another way, partial matching may be thought of as adding extra rows that are less complete, whereas approximate match is relaxing the match criteria so one can match rows that do not exactly match the mask, or actual complete set of symptoms.

A PMPFS that excludes a range of values. One method to effectively support partial matches while avoiding an exponential explosion in the number of PMPFSs is to allow a potential fault scenario to specify a given symptom as excluding some value, or a range of values. Typically values are used that would contradict the associated fault being the root cause. In the Power Example of FIG. 7, a PMPFS may be specified as requiring the lossOfSignal symptom to be either true or not known. Then, a match occurs as long as no neighbor switch is claiming to receive a signal from the switch that has supposedly lost power. That is, the match still takes place if this symptom is not known for some of the neighbor switches, for example I25-x (792x) which was unknown.

In one embodiment, the representation of a PMPFS allows the specification of exclusion-based matches, not just inclusion, in range specifications. For example, in the referenced disclosure, the binary representation of a ternary value can use the "unknown but true" value (i.e. 01) that is otherwise unused to designate "not known to be true". In general, there exist traditional techniques for data representation that may be used to efficiently encode extra information that correspond to exclusion as well as inclusion.

Restricting scope of a PMPFS. Another method to effectively support partial matches while avoiding an exponential explosion in the number of PMPFSs is to restrict the scope of a PMPFS and its symptoms and corresponding reduce the probability associated with it. In the Power Example of FIG. 7, a PMPFS may be generated that matches on the current power failure sensor (702z) for the switch SW0 (702) and specifies "don't care" in effect for the telemetry of the neighbor switches (742a, 762b, 792x). This PMPFS then matches if the power sensor (702z) reports a power failure yet there is contradictory information from one or more neighbor switches, such as an "unknown" for I25-x (792x), which may be incorrect or stale.

On the other hand, if the above PMPFS for the same switch SW0 (702) matches with an exclusion-based match, this lower probability match is filtered out by the refinement step. In general, the generation of a PMPFS may restrict the scope based on relationship to other elements, the types of the other elements, specific properties of these elements and other attributes.

Defining an aggregate symptom. Another method to effectively support partial matches while avoiding an exponential explosion in the number of PMPFSs is to define an aggregate symptom that is set based on telemetry across multiple sensor inputs. In the Power Example of FIG. 7, one may define an aggregate symptom that corresponds to more than some threshold K of neighboring switches SW1 (742), SW2 (762), . . . , SW15 (792) having loss signal from a given switch SW0 (702). Then, a PMPFS for switch loss of power may specify this aggregate symptom so that the switch has deemed to have had a power failure if most of its direct neighbors have loss signal from it. To be clear, the benefit of incorporating this information from its direct neighbors is that it helps disambiguate this case from that in which the current sensor on the switch has failed, not the power itself.

Back propagation of symptoms. Another method to efficient support partial matches is to exclude from a PMPFS symptom requirements that have been determined by what is referred herein as back propagation, short for "back propagation of symptoms". In the Network Example of FIG. 4, one likely explanation for a signal not being received at the far/SW1 end (442) of link a (422) is a broken network cable. An alternative explanation for a signal not being received at the far end of the link is that the interface I1-a (404) at the near/SW0 end (402) has lost power. This is because loss of power at an interface at one end of a link (422) effectively propagates a loss of signal symptom to the interface at the other end of the link.

Using back propagation of symptoms, the full fault scenario of symptoms for this scenario requires that the loss of power symptom for each interface and/or switch (406, 446) is false. However, this back propagation also means that if the current power sensor (406) for this switch SW0 is faulty, the ARCA may fail to match to the full fault scenario and thus not determine the root cause unless there are matching PMPFSs. In this case, there may be a PMPFS that excludes these symptoms arising from this back propagation, typically with an associated lower probability given the uncertainty introduced by ignoring the symptoms that would otherwise be required because of the back propagation.

Combinations using back propagation of symptoms. Each of the earlier techniques or methods may also be applied to back propagation of symptoms, including: 1) using a subset of the back-propagated symptoms 2) using an aggregate of the back-propagated symptoms, and 3) using exclusion of symptoms values, rather than an inclusive range.

In general, PMPFSs allow an engineering trade-off between accuracy of root cause analysis and the computer memory/processing for a large number of PMPFSs. That is, computer memory requirements may be reduced and/or computer processing speed may be increased with fewer number of PMPFSs. More accurate analysis requires more compute resources than a less accurate analysis. However, beyond a point there are diminishing returns for using more PMPFSs, as the uncertainty with correctness and availability of telemetry limits the certainty of any analysis.

Using the techniques herein recognizes and addresses a major fallacy in the traditional approach to ARCA; the assumption of a single root cause and the assumption that determining that the actual root cause is feasible to determine with certainty from sensor input. Sensor input may be incorrect. Generating a set of potential root causes based on matching potential fault scenarios, some of which may correspond to the same root cause fault, and then providing a refinement step to produce a curated set of potential root causes may thus be one way of selecting the RBS action based at least in part on probability.

In one embodiment, the model may specify that the actions are commutative in the sense of "may be performed in any order and do not affect the evaluation of conditions", and this is referred to herein as a commutative action RBS (CARBS). In one embodiment, when the model so indicates, the implementation may perform the action associated with each of the multiple entries in the matchset without rematching. For example, in the self-driving case, the matching may identify both "enteringGreenBlockedIntersection" and "aboutToTurnRight" with the action associated with the first condition being"comeToStop" and the action associated with the second condition being "turnOnRightSignal". It makes sense to perform both actions in this case.

In one embodiment, one or more scenarios in the matchset may be identified as alternatives of a given scenario S, using matchset refinement as described above. In this case, the scenario that is identified with the greatest confidence and possibly other criteria may have its action performed, while suppressing or not performing the actions of the alternatives.

In one embodiment, it may be necessary to ensure that some action is not executed repeatedly when the associated rule condition remains true. There are various techniques to avoid re-execution. For example, the implementation may record the time of the condition match that it last executed the associated action and not re-execute the action until the condition has become false and then true again. That is, if there has been no update to the match timestamp, the action is not re-executed.

One alternative approach is to make an action idempotent. That is, if the action procedure is executed more than once in the same scenario, it has the same effect as being executed once. For example, the action of "comeToStop" may be made idempotent by having it continue applying the brakes if it is already applying the brakes, so invoking this action multiple times has the same effect as invoking it once, i.e. idempotent. An idempotent action may be re-executed on each match, but has no effect in second and subsequent matches.

In general, there are a variety of means to separate the action implementation from the classification of scenarios, to parameterize the action implementation in terms of the triggering scenario, and to perform conflict resolution and/or matchset refinement and deal with action re-execution. Moreover, these techniques may be independent of the actual model being specified so are not strictly dependent on automatic code generation. This is evident from the above code snippets in which the action mapping code is not specific to any aspect of the model, unlike the condition code itself.

That said, automatic code generation may perform various optimizations in the action mapping, such as eliminating the code for conflict resolution when the model is specified as a CARBS instance. The action itself is assumed explicitly specified as a procedure or similar, so may not necessarily require or entail automatic code generation herein. Therefore, rule condition code generation is described below.

Automatically Generation of Rule Condition Code. The automatic generation of rule condition matching code may be more sophisticated than that outlined above for realistic application models. For instance, the previous example suggested there being a single trafficLightDetector, an intersectionDetector and obstacleDetector. However, in reality there may be numerous traffic lights and intersections in the area that the AV is traveling. Thus, the intersection detector needs to be pointed at the one relevant to the position and velocity of the AV, same with the trafficLightDetector and the obstacleDetector. That is, the obstacle detector may need to detect obstacles on the path that the AV is travelling.

In a table-based embodiment, this issue is addressed by generating a symptom per element instance and generating a row in the RCT for each combination of trafficLightDetector, intersectionDetector and obstacleDetector-specific symptoms for those that are colocated. The example used earlier from the network domain further illustrates this approach. The RCT approach generates a row for each pair of connected interfaces, with the symptoms specific to those interfaces set to indicate loss of signal, along with a row for each uni-directional cable failure. In effect, there is a DAG as illustrated in FIG. 4 for each pair of connected interfaces, with the corresponding row containing the leaf subconditions for that DAG. Thus, if there are 10,000 cables in a data center network, there are 10,000 rows associated with this one logical fault, one for each pair of interfaces. This approach of separate actual symptoms and rows for different parameter values in effect for a condition is an approach used for automated root cause analysis.

In one embodiment, explicit condition evaluation code is generated instead of relying on table matching. Each non-const rule may thus have a code snippet generated that evaluates the associated rule condition that is parameterized in terms of the elements involved, and there is an associated data structure that provides these elements as parameters. The evaluation of the condition for this logical root cause is then performed by iterating over this collection, invoking the code snippet for each set of parameters, as indicated in this data structure. For example, there may be a collection of the pairs of connected interfaces which is then used to invoke the code snippet associated with detecting a cable fault. Iterating over this collection, invoking the code snippet on each pair then detects if there is a cable fault.

Note that, using this example, there may be 10,000 entries in this collection for the 10,000 cables in the data center network, similar in space overhead to some degree to the 10,000 rows in the RCT associated with this fault. However, if there is a second root cause fault that is associated with connected pairs of interfaces, the same collection of pairs may be used to iterate with this second root cause code snippet, whereas with an RCT, there is necessarily a second set of 10,000 rows associated with this second root cause fault. For example, if there is a root cause that implies from one interface to the other, as opposed to bidirectional implication from the cable, this same collection may be used to evaluate this other root cause. For instance, if one direction of a cable is broken then one interface detects a loss of signal but the other interface does not. This root cause fault may be identified using the same collection of interface pairs, similar to that shown in FIG. 4.

In one embodiment, when multiple conditions use the same or a subset of the parameters of a given logical root cause, these multiple conditions are combined into a single code snippet that may be invoked as part of the iteration of these parameters, evaluating the set of conditions for each step of the iteration. For example, each step of the iteration might detect if there is a broken cable, half-broken cable, excessive packet corruption and excessive packet drop in a single invocation of the associated code snippet.

In some applications, there is a need, independent of the rule execution, to maintain data structures that correspond to the elements, their attributes and their relationships. For example, a network management application may require maintaining an object per switch in the network that stores attributes of the switch and its relationships to other elements in the network, including how it is connected to other switches.

In one embodiment, when the application maintains objects corresponding to the elements and their relationships, these data structures are used to provide the parameters for one or more of the RC code snippets. For example, continuing the above example, the rule engine may iterate over the element objects, determining for each one, the other element(s) to which it is connected, thereby generating the pairs of connected interfaces that are required for rule condition evaluation in the above example. Then, a separate collection of connected interface pairs is not required. In this case, given the application is storing this information for other purposes, the explicit rule condition code generation approach does not generate extra space overhead by its need for these parameters for its code snippet. On the other hand, it does not seem feasible to capitalize on the application state associated with elements and relationships to reduce space when the table-based approach is used, so the latter likely incurs more space overhead in these applications.

In other realizations of automatic root cause analysis with an RCT, the current symptoms are periodically matched against the table to check for root cause faults as illustrated in FIG. 5D. Similarly, a rule engine normally repeated polls the entire rule set to check for rule conditions that are true, in order to detect that a rule action may be triggered. However, this approach suffers from the typical trade-off between the overhead of rapid polling and delay to detect conditions that may trigger actions. In particular, higher frequency polling to minimize delay in triggering an action introduces significant overhead whereas lower frequency polling to reduce this overhead increases the delay to trigger after a condition becomes true. An alternative approach supported with explicit rule condition code is to have a reactive implementation in which an input attribute change triggers an immediate re-evaluation of the rule conditions that are dependent on this input. Thus, the action may be performed without delay if the rule condition for that action has now become true. Such a reactive implementation is described below.

Reactive Rule Engine Implementation. In one embodiment, a compiler outputs code that implements a reactive rule engine. It may be reactive in the sense that it directly reacts to input changes and performs the actions associated with rule conditions that have become true as a result of the input change, if any.

Figure 8:
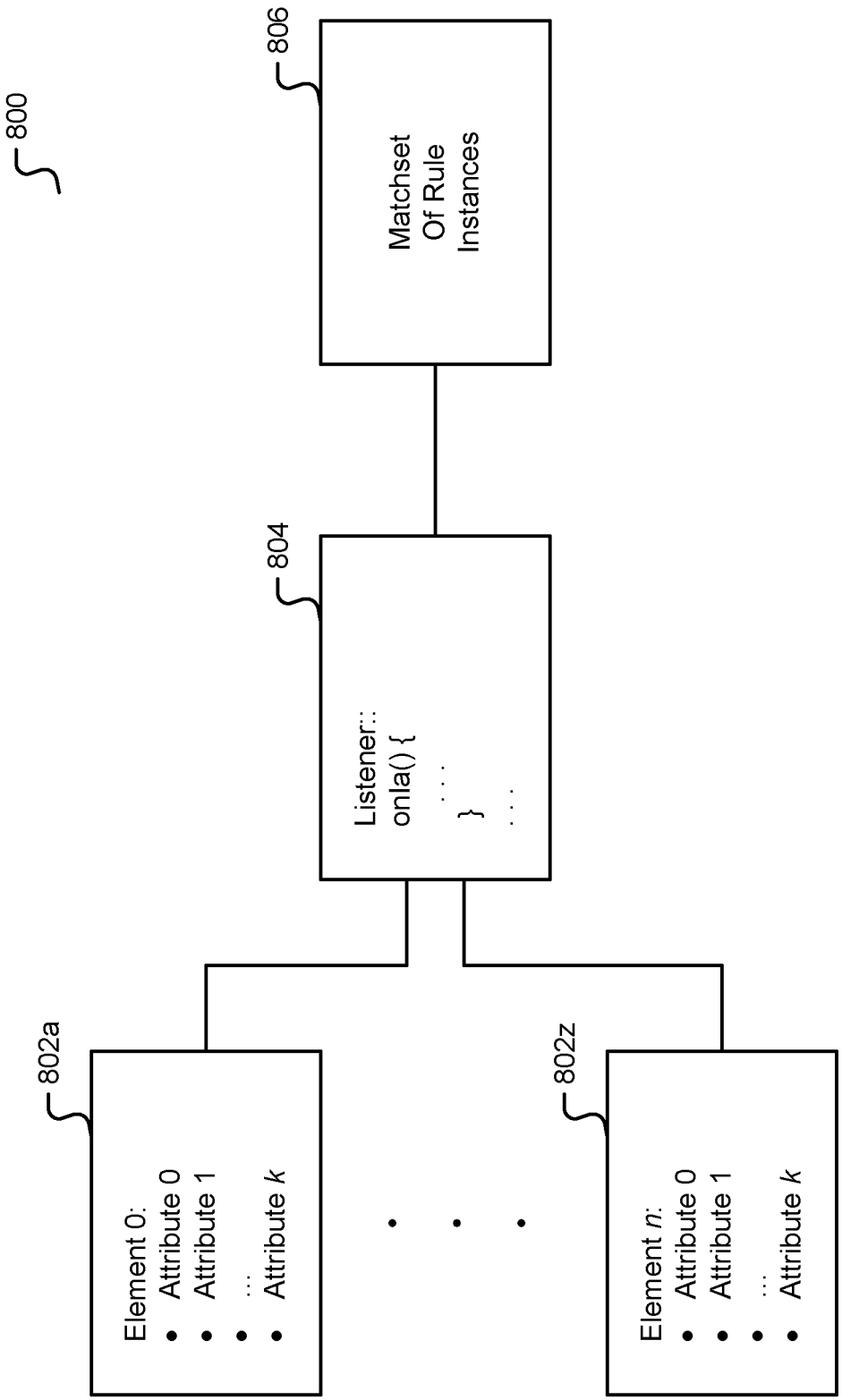
FIG. 8 is an illustration of an embodiment of a reactive rule engine.

FIG. 8 is an illustration of an embodiment of a reactive rule engine. In one embodiment, the reactive rule engine is realized as a "listener" module (804), as shown in FIG. 8. The "listener" or equivalently "observer" (804) is a traditional software design pattern in object-oriented programming. In essence, a listener (804) is a module that is notified by a callback when some attribute of interest in one of the "listened-to" objects (802) has changed. Thus, the listener (804) reacts to element attribute (802) changes, adding a rule instance to the matchset (806) if the rule condition is true.

There are established techniques for manually implementing a listener module in C++ and other languages. Overall, in this embodiment, the compiler portion generates the code for the element types and callback notifications using other techniques, including those disclosed in U.S. patent application Ser. No. 12/154,354 entitled DYNAMIC COLLECTION ATTRIBUTE-BASED COMPUTER PROGRAMMING LANGUAGE METHODS filed May 21, 2008 which is incorporated herein by reference for all purposes. It further generates a listener module (804) using the techniques in U.S. patent application Ser. No. 12/154,399 entitled NOTIFICATION-BASED CONSTRAINT SET TRANSLATION TO IMPERATIVE EXECUTION filed May 21, 2008 which is incorporated herein by reference for all purposes, with a callback procedure for each callback notification, namely for each modifiable attribute that is required for evaluating an observable subcondition. In this context, a rule may regarded as a constraint between the model and a matchset of action labels that requires the action label for the rule to be in the matchset collection if the rule condition is true.

In one embodiment, the listener module (804) is generated to listen to each input attribute of each element (802a, 802b, ... 802z) that is instantiated in the model. Thus, in C++ terminology, the compiler defines a class with a data member that points to each element to which this module needs to listen or react, either as a single pointer or as a collection of pointers if there are multiple such elements of the same type. For each input attribute ia, the compiler also generates a callback function "onIa( )". Following standard practice in C++, this callback may be in a separate class that is a derived class of the callback interface, which then calls into the actual main listener module class. The callback function is generated with code to evaluate each of the rule conditions specified in the model that is effected by this input attribute ia changing. Consequently, when attribute "ia" changes, this Listener::onIa ( )(804) procedure is invoked. This procedure evaluates the rule conditions that are dependent on this input and outputs the action labels for each rule condition that evaluates to true (806).

Note that especially with more complicated rules, the relationship between objects clarify and/or indicate connections. The compiler also generates the necessary data members and collections in the listener module to allow these rule conditions to be evaluated. For example, returning to the example of the computer network model, the rule condition corresponding to a broken link needs to know the "other" interface, the one at the other end of the link, to evaluate the rule condition as illustrated by the following code:

```
otherInterface = getOtherInterface(notifier( ));
if(notifier( )->lossOfSignal( )&&(otherInterface-
>lossOfSignal( )) {
    indicateCableBreak( );
}
```

The generation of the "if" condition in the above code snippet is straight-forward because it is just the conjunction of the observable subconditions that are the leaves of the DAG rooted at the rule condition, as was illustrated in FIG. 6B.

In the above, "notifier" corresponds to the interface element that is performing the callback and otherInterface is the interface to which it is connected (indirectly through Link and Unilink objects), as returned by getOtherInterface. Thus, the compiler may generate code to store and maintain a collection in this listener module that may hold the connected interface pairs. Consequently, when the above condition is to be evaluated as part of executing this callback function, the "otherInterface" variable in the above code is set to the interface that the "notifier" interface is connected to by accessing this collection.

Note that an input attribute is specified as input in the model but may be a complex calculation from actual system inputs. For example, an input attribute may be a weighted moving average of some raw sensor value that is only updated when the average changes by a significant amount. Thus, the actual input may be changing more frequently and with more significant changes that the input attribute used in the model.

In one embodiment, the listener module (804) is realized as a derived class (in C++ terminology) of a base class that defines and implements the action procedures. For example, the actions may be manually specified in C++ as follows:

```
class ActionModule {protected:
    void indicateCableBreak( Interface * intf0, Interface * intf1
);
    void indicateUndirectionalCableBreak( Interface * intf0 );
...
}
```

The procedure bodies may be specified separately as is typical practice in C++. Then, the rule model may be generated as a derived class of this ActionModule, e.g.

```
class RuleModule : public ActionModule {
    ...
}
```

That is, the (generated) RuleModule is a derived class of the ActionModule which may be explicitly programmed so it is able to access the "protected" action procedures provided by the latter module. Then, the rule evaluation code may be generated for each input attribute as described earlier, and the calls to the action procedures just invoke those specified in the ActionModule, which is incorporated by inheritance into the Rule Module.

In one embodiment, selected portions of the listener module code may be provided by manual programming. For example, by specifying "external" in a rule condition, the automatic generation does not generate a rule condition for that rule, but instead assumes/relies on manually specified code that handles this condition. This provision recognizes that there often a need for a few special optimizations for a particular application that are beyond that supported by the compiler.

Figure 9:
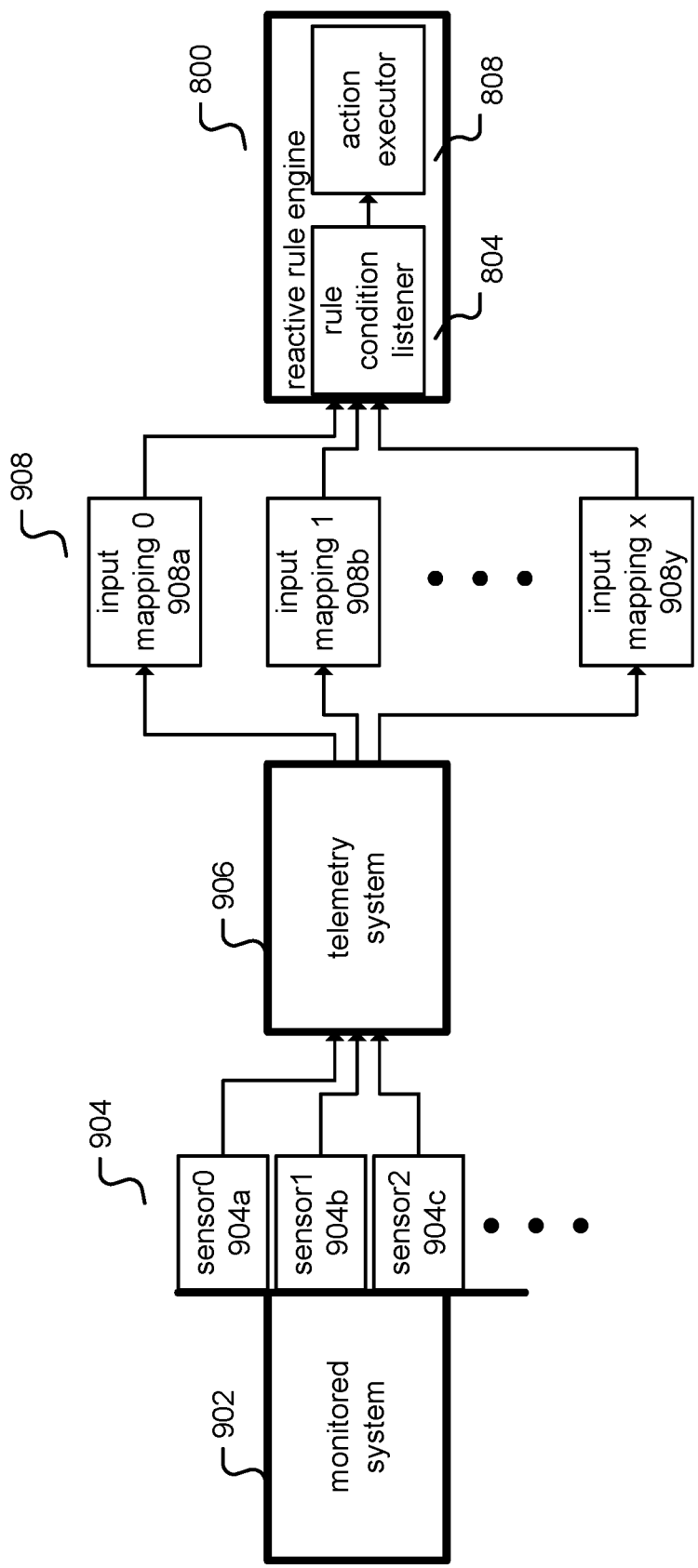
FIG. 9 is an illustration of an embodiment of a reactive rule engine in a monitored system.

FIG. 9 is an illustration of an embodiment of a reactive rule engine in a monitored system. FIG. 9 shows how the reactive rule engine (800), structured as a listener module (804) and an action execution module (808), is connected to a monitored system (902 to 908). In FIG. 9, sensors (904) provide measurements of values associated with the monitored system (902), such as temperature, humidity, and so on. These values are collected by a telemetry system (906) that delivers these values for input processing (908), which may take several actions on the inputs. For example, it may translate the sensor input values from one measure to another, such as from A/D units to temperature in Celsius. It may also interpolate or extrapolate sensor values in the case of missing values or smooth or correct sensor values in the case of spikes or erroneous values that may be due to sensor transients. In that vein, it may provide a computed value from the inputs, such as a weighted moving average on some input. It may also discretize the input stream into a small number of discrete values defined by thresholds, such as for example cold, cool, warm and hot for a temperature reading. Thus, the reactive rule engine (800) is only reacting to changes of temperature that cross a threshold. Finally, it may withhold input values from the listener (804) until some specified period or round, to support periodic polling for rules, rather than reacting to each input changes, as described later. That is, mapping may restrict the reactive rule engine to only reacting to threshold crossings to reduce noise, withhold input value to reduce noise, and so on.

In one embodiment, if multiple rule conditions are dependent on the same input attribute, the compiler generates these rule conditions in the same callback function.

To recognize a rule condition in the matchset that is not longer valid, a periodic process may test the set of matched rule conditions and delete it from this collection if it is no longer valid and/or when an element "bar" changes, it may prompt the re-evaluation of any RC in the set that is dependent on this element. In an embodiment in which only a single independent rule condition should be true at any time, the matching to a different rule condition can immediately delete the existing rule condition, if any, from the match set.

In one embodiment, as an optimization, the compiler may recognize the case of objects in the model that exist entirely for const rules and do not correspond to any inputs. For example, a cable in the network typically has no sensors on it, and thus is modeled without input indicators. It exists only to provide a context to specify one or more rule conditions and their implications. In these cases, the compiler may optimize these objects out by collapsing the relationships so the evaluation takes place directly to the objects with observed symptoms. For instance, in the example of a computer network, the Link and Unilink objects may be optimized out and the interconnection between interfaces may be recorded directly in the Interface objects. In particular, with this optimization, an interface contains an attribute "otherInterface" which points to the interface it is connected to. In the special case of a relationship like "parent", the parent is easily determined from the component element by the usual parent back pointer.

A non-binary relationship may be decomposed into binary relationships, so the above approach may be used to handle ternary relationships/parameters as well. When the reactive rule engine software is initially executed, the generated objects may be instantiated with initial values for the input attributes that do not occur in practice. The rule engine process and these input attributes may then be connected to the actual telemetry which causes these input attributes to be changed to different values, causing the reactive behavior to match the rule conditions as described earlier, and then invoking the relevant rule(s), if any.

In one embodiment, the compiler optimizes the generated code in the callback function to reduce the execution time and the code size. For example, in the above code snippet, if another rule condition requires the "otherInterface", the generated code is optimized to access this value once from the above collection and use this value for both rule conditions.

As another candidate optimization, the subexpression involving this notifying input attribute may be tested first before performing actions necessary to evaluate the rest of the rule condition. For example, the above code snippet may be optimized as follows:

```
if(notifier( )->lossOfSignal( )) {
    otherInterface = getOtherInterface(notifier( ));
    if(otherInterface->lossOfSignal( )) {
        indicateCableBreak( );
    }
}
``` where getOtherInterface is a procedure that returns the other interface.

Nesting the getting of the otherInterface within an "if" block means that getOtherInterface procedure call is only executed if the notifier's lossOfSignal attribute is true. In the expected common case, this attribute may be false, thereby saving the cost of this call.

A further optimization is to recognize common subexpressions in the rule conditions that are being evaluated. For example, the rule condition corresponding to unidirectional cable break corresponds to loss of signal at one end but not the other. I.e.

```
if(notifier( )->lossOfSignal( )) {
    otherInterface = getOtherInterface(notifier( ));
    if(!otherInterface->lossOfSignal( )) {
        indicateUnidirectionalCableBreak( );
    }
}
```

By recognizing common subexpressions, this rule condition may be optimized as per the following code:

```
if(notifier( )->lossOfSignal( )) {
    otherInterface = getOtherInterface(notifier( ));
    if(otherInterface->lossOfSignal( )) {
        indicateCableBreak( );
    }
    else {
        indicateUnidirectionalCableBreak( );
    }
}
```

In one embodiment, the compiler can determine that one or more arguments for rule expression can be determined from attributes in one or more of the elements. For example, in the running example of a network, an Interface instance can have a pointer to the Unilink instance to which it is connected and the Unilink instance can have a pointer to the Interface to which it is connected. Plus, the interface necessarily specifies an inverse relationship, such as the connectedToBy relationship in the Interface. Therefore, the compiler can generate a C++-like implementation of the getOtherInterface as:

```
Interface::Ptr
getOtherInterface( intf ) {
    auto unilink = intf->connectedToBy( );
    return unilink->connectsTo( );
}
```

This procedure follows these pointers to return the "otherInterface" using the state in these network elements rather than having a separate collection of interface pairs, thereby avoiding the associated state overhead.

In one embodiment, the referenced attribute is a collection. For example, in a broadcast network, an interface may be regarded as being connected to multiple different interfaces. In such a case, the rule condition may be evaluated in an iteration loop, where the value of "otherInterface" is set to the next other interface for each iteration of the loop.

In one embodiment, an element type may be defined as a derived type of another element type, similar to the inheritance mechanism in most object-oriented languages. A derived type may add additional subconditions over those in the base type. It may also extend or override the subcondition implications provided in the base type. In a particular case, a derived type subcondition may correspond to an extended or refined version of a rule condition in the base type. Such a derived rule condition may extend or refine the observed subconditions of the base rule condition. For instance, a base rule may specify its rule condition to imply observed subconditions SC0 and SC1, so its condition expression is:

(SC0 && SC1)

whereas the derived rule may specify subcondition implication that further leads to SC2, so its condition expression is:

(SC0 && SC1 && SC2)

In one embodiment, a rule condition may be specified in the same type by specifying that it "extends" an existing rule condition, allowing a derived rule condition to be defined in the same element type as the base rule condition.

The derived versus base rule conditions may be used to effectively specify partial matching of subconditions. Or conversely, it may be used to avoid the case of a rule condition failing to match when one or more subconditions are missing even though the intended scenario is very likely the case. For example, a base rule condition for an object being a stop sign may be it having the observed subcondition of being octagonal as well as being red. A derived rule condition may specify the additional subcondition of the sign being inscribed with the word "stop". An object may still be recognized as a stop sign even if the inscription may not be read yet recognized with greater confidence as a stop sign if the inscription may be read. The derived relationship between these rule conditions provides an indication to suppress the match to the base rule condition when the derived rule condition is matched.

In one embodiment, the compiler may automatically generate derived rule conditions based on inference, that is back propagation of subconditions, as described above as back propagation of symptoms. In particular, the compiler may add observed subconditions in a derived rule condition that may be false, thereby disambiguating the specified rule condition from other rule conditions that otherwise overlap in the observed subconditions that cause them to trigger.

The optimizations described above may be used to optimize the code for handling the base condition and the derived condition(s) evaluation. In the simple case, the code is structured as:

```
if( <baseCondition> ) {
    if( <additionalDerivedCondition> ) {
        performDerivedAction( );
    }
    else {
        performBaseAction( );
    }
}
```

That is, the derived rule condition is evaluated only if the base rule condition holds.

In one embodiment, the action mapping/conflict resolution recognizes the case of both the base and derived actions labels being present and only executes the action associated with the most derived rule condition.

In one embodiment, an input subcondition may be defined as an expression in terms of actual input attributes. For example, rather than the Switch::lossOfSignalIn Boolean input attribute, a switch may have a Switch::signalInLevel attribute. Then, loss of signal from input is indicated by the expression switch->signalInLevel( )<minSignalLevel( )

In the model, this may be expressed as:

```
lossOfSignalIn : Subcondition {
    = signalInLevel( )<minSignalLevel( );
}
```

In one embodiment with input subcondition expressions, the compiler, as an optimization, generates code such that it performs the check that the subcondition associated with the notification is true on notification before performing the associated rule evaluation. That is, as an example, if notified of a change in the signalInLevel, the callback returns immediately if the value greater than or equal to "minSignalLevel".

In one embodiment as above, the compiler, as an optimization, generates code that evaluates this input subcondition before invoking the callback and only invokes the callback procedure if true.

The method used by the compiler to generate the rule evaluation code may be described as follows:

```
for each rule condition RC {
    1. follow the implication of subconditions from rule
condition RC to generate a set
        of observable subconditions, the observable subcondition set
(OSS).
    2. for each observable subcondition OSC in OSS {
        2.1 for each input/notifying attribute IA in OSC {
            2.1.1 find the callback procedure body data structure
for the "onIa" procedure,
                declaring this callback procedure if not already
declared.
            2.1.2 find an existing "if-else" statement in this
procedure that tests the subcondition associated with IA.
            2.1.3 if not found, instantiate this "if-else"
statement
            2.1.4 embed the rest of the subconditions in OSS in the
"if" block if a true subcondition
                and otherwise in the associated "else" block.
            2.1.5 insert the action or action label in the
resulting block that is entered
                if this condition evaluates to true.
        }
    }
}
```

Step 1 populates the OSS with the leaves of the DAG associated with rule condition RC, referring to the DAG representations of rule conditions illustrated in FIG. 4.

In Step 2 above, the standard compiler technique of having an internal data structure representation of an "if" and "else" statement is assumed. Moreover, OSS is just a data structure representing the logical conjunction of the subconditions, similar to the parse tree structure found internal to many compilers. With this representation, additional statements may be added to the body of an "if" statement in the same way as such a data structure is normally built up by parsing input. The primary difference is that rule condition is embedded in an "if" or "else" statement that is conditioned on input attribute IA rather than being placed exactly as dictated by the parsed input as in a normal programming language. Also, the compiler needs to determine the access path to other values required to evaluate the rule condition, e.g. in our network example, determine how to access the "otherInterface". However, this access path may be determined by the relationships across which the current rule condition transits to this subcondition and the relationships from the current rule condition to these other subconditions In particular, for each other subcondition SCi, it uses the inverse relationships to access back to the rule condition scope and than the implication relationships to these other subconditions to build a path to access the data required for each subcondition. In one embodiment, the compiler has to evaluate the access path, in part to find the other interface. Thus, the compiler may use the DAGs to determine this access path through inverting relationships.

The steps to generate the code for finding the corresponding element or elements for a given argument to a condition are:

a. make the input subcondition be the current subcondition b. find the inverse relationship for the relationship across which the current subcondition is implied. (The inverse relationship is indicated as such in the model, as illustrated by the connectedToBy relationship specified in FIG. 2.)

c. generate code that processes each element in this inverse relationship as follows (either a "for" loop if a collection or an "if" condition if a singleton (to allow for this singleton being null)):

i. get the subcondition that implied the current subcondition, if any. There is often a single such subcondition, so this is specified as such in the code in these cases.

ii. follow the implying relationships across which this subcondition implies, forward to the input attributes, excluding the relationship corresponding to the inverse relationship just traversed. (In the "otherInterface" case, there is no other relationship except for the case of the rule condition itself.) Record the input attribute values to use as arguments to the condition.

iii. if this subcondition corresponds to a rule condition, the argument generation is complete.

iv. otherwise, invoke this procedure recursively on this subcondition.

For instance, in the case of the example computer network, the input attribute of "lossOfSignalInEth14" is known to be implied by interface named "eth14" from the "lossOfSignalIn" subcondition. The latter has no other implications. The inverse relationship to that implying this subcondition is the connectedToBy attribute, which then provides the in-bound Unilink object. The Unilink::lossOfSignal subcondition has an inverse relationship that is implied by the Link::cableBreak subcondition which is a rule condition, thus terminating the back propagation across inverse relationships. This rule condition implies across the components of Link that are of type Unilink. Because there are two such components, it is evident that there is a single "other" component, namely the other Unilink instance, given one may correspond to the relationship that is inverse to the other to get to this rule condition. Doing forward traversing on this "other" Unilink component yields the "other" interface to which this Unilink component is connected, which is the argument required in this case for condition evaluation. The generated code may be optimized to bypass the Link level and recognize the connectedTo Unilink instance as the inverse containing the pointer to the "otherInterface". The result is code that finds the "otherInterface" by a minimal number of memory references.

This same internal compiler data structure representation of this generated code may be used to perform various optimizing transformations to reduce the code size and improve execution performance using standard compile optimization techniques as well as others made possible by the structure and specification in the model.

The implementing of the rest of the subconditions described in the above sequence includes generating code to access the values used by these other subconditions, along the lines described for the "otherInterface" in the earlier examples.

In one embodiment, the model is expressed in a general-purpose object-oriented language in which the concept of a subcondition, and subcondition implication have been added. In another, a rule construct is added and the implications are indicated as Boolean expressions. The compiler is then extended to perform code generation on these rules, subconditions and implications, as described above.

To avoid excessive callback overhead, an input value may be discretized in the input attribute to a condition so that notification only takes place when the value crosses some threshold relevant to the condition. For instance, if a condition specifies the temperature as being hot as a subcondition, the temperature sensor may provide a discretized attribute that indicates only "hot" or "cold". Thus, a notification does not occur on each minor change in temperature but only when the input value changes from "cold" to "hot".

Polling and Polling Optimization. In some applications, a reactive execution of a rule engine incurs excessive overhead because of the rapid change in input values, most of which not leading to any rule triggering. For example, if the rule engine is performing root cause analysis and only triggers a rule when there is a system fault and a system fault rarely occurs, the vast majority of the reactions do not result in useful processing. Moreover, in some applications, the rules only need to be invoked when a condition persists for some time rather than only occurring transiently. This applies in the root cause analysis use case. After a fault occurs, the condition that indicates the fault tends to persist until the fault is remedied. With this assumption, it is not necessary to react to every input change. Instead, the rule engine may periodically re-evaluate the rule conditions rather than reacting to every input change. In one embodiment, the rule engine may invoke the same generated code to periodically evaluation all rule conditions.

In one embodiment, a periodic evaluation and triggering of rules is provided by only updating the input attributes to their current values at the start of each period. These updates causes the rule conditions that are dependent on input attributes that are changed as a result of updating to be (re-)evaluated on the current inputs. Thus, rather than reactive to each input attribute change, the same rule engine may be executed periodically and still operate correctly. In fact, the same generated code may be invoked to be reactive or to be invoked periodically, depending on how the input processing is configured. That is, the input processing may be configured to update input attributes as the input is received or only at a poll period interval. Note that the above processing assumes that in this application, not triggering an action in response to an intermediate change to an input between these periods is not a problem when the triggering condition is not true at the start of the next period. That is, the application allows skipping an action when its condition is only transiently true between periods of execution. In one embodiment, this may be done by freezing all inputs for a period of time and updating at a discrete time period later.

In an alternative implementation, the compiler generates a procedure PP that, when invoked, invokes each of the reactive procedures with each of the possible parameters. In this embodiment, this PP procedure is invoked at the start of each period.

In one embodiment, the implementation of the procedure is optimized to minimize or avoid duplicate rule evaluation. For example, considering the previous example of the rule condition associated with a broken link, the procedure may recognize that the evaluation of the rule condition with the pair of interface (intfj,intfi) is the same as evaluating the rule condition with the pair of interface (intfi,intfj) so only one of these is executed as part of this procedure execution. This embodiment can generate a single optimized pollEvaluate procedure that implements all the rule conditions when invoked, outputting an indication of the rule conditions that are true.

Overall, the same code generation techniques may be used to generate rule engine code for a periodic polling form of execution as well as for the reactive execution described earlier, and in one embodiment dynamically switch. One of ordinary skill in the art of software programming may recognize that a variety of optimizations may be implemented beyond the ones detailed here, allowing efficient execution in the case of polling form of execution.

Back Propagation and Automatic Checking of Rules. In one embodiment, the compiler checks for ambiguity of the rule conditions. Two conditions are partially ambiguous if there is a subset of inputs on which both match. The two conditions are fully ambiguous if the two conditions match on the same subset of inputs.

In one embodiment, the compiler checks for this ambiguity. One method of doing so entails generating the equivalent of a root cause table for the specified model and conditions. In particular, there is a column for each specific instance of an observable subcondition. For each rule, there is a row that represents the condition in terms of observable subconditions, where the entry for a given subcondition is true if the subcondition is true in the condition, false if the subcondition is false in the condition, and "don't care" in the case of a ternary matching RCT and the subcondition is not specified in the generated condition.

With this generated table, the compiler then performs a pair-wise match of each pair of rows in the RCT. If Ri matches Rj, then Rj is partially ambiguous to Ri. I.e. Ri matches whenever Ri matches. Similarly, if Rj matches Ri, then Ri is partially ambiguous to Rj. If the pair matches both ways, they are fully ambiguous.

In one embodiment, the compiler may output a warning message whenever it determines that a pair of rules are ambiguous, either partially or fully. The rule set maintainer may then choose to refine the model and the associated rule conditions to eliminate this ambiguity.

In one embodiment, the compiler may try to disambiguate a pair of rule conditions Ci and Cj that are ambiguous. In one approach, the compiler traces back from each subcondition SCk that is part of generating the rule condition Ci to any other subconditions may cause this subcondition SCi to be true that is not true for Ci condition. For such separate subcondition SCl, it forward traverses from that subcondition to an observable subcondition SCm and adds the negation of this subcondition SCm to the condition Ci. This addition ensures that Ci and Cj are no longer ambiguous.

Figure 10:
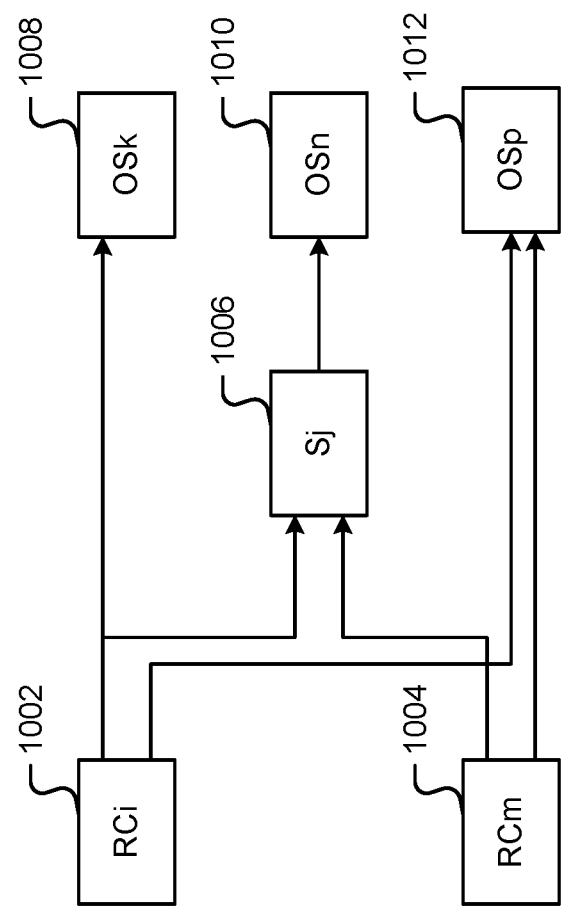
FIG. 10 is an illustration of an example of back propagation of subconditions.

FIG. 10 is an illustration of an example of back propagation of subconditions. RCi (1002) and RCm (1004) each imply observable subconditions OSk (1008) and OSp (1012), respectively. RCi (1002) and RCm (1004) also imply Sj (1006). RCi (1002) further implies OSp (1012). Thus, the compiler may add "not OSk" to the generated rule condition for RCm (1004) to further differentiate it from RCi (1002). That is, OSk (1008) being false means that RCi (1002) cannot be true. As a further example, considering a network of FIG. 4, a power failure on both switch interfaces can cause the same symptoms of lost of signal at each end as for a broken link. Therefore, back propagation would add a false entry for loss of power on interface for each interface to the row corresponding to cableBreak rule condition if the interface power symptom was added to the model.

In one embodiment, the compiler only reports as a warning the ambiguity of pairs of rule conditions that it is unable to disambiguate. Subsequent processing can determine the action to perform when this case arises.

Benefits of automatic generation of a rule set implementation. A first benefit of automatic generation of a rule set implementation is that it allows the implementation of a rule engine in which the rule condition evaluation is efficient because the forward and backward inference searching of others is removed from run-time overhead by compiling the rule conditions, either into a table or "if . . . else" statements.

A second benefit of automatic generation of a rule set implementation is that it allows a reactive rule engine implementation, that is, one in which it reacts to immediately to an input attribute change by re-evaluating the rule conditions that are dependent on this input attribute. This reactive approach works well when fast response is critical, and avoids the trade-off between overhead of rapid polling and slow response time.

A third benefit of automatic generation of a rule set implementation is that it allows automatic checking for under-specification and over-specification of rule conditions and disambiguation of under-specified rule conditions in some cases using back propagation. This facility reduces the difficulty of maintaining and extending complex rule sets. It also teaches how to completely embed the rule set in an application-specific object model, further aiding the development and extensions of complex rule sets. As can be seen from the above description, the detailed specification of the relationships between objects, as provided by the model, is a key aspect in the correct evaluation of rule conditions.

In the explicit code approach, as opposed to the table-based approach, there are further benefits. In particular, the explicit code approach makes it feasible to change the relationship between elements without having to recompile the model. It is a matter of modifying the collection(s) indicating a given relationship that has changed. For example, using the network example, a new interface pair (Ii,Ij) may be dynamically added when a new link is added between these interfaces without any recompilation.

Also, memory is saved in some applications because there is one instance of code to evaluate a condition rather than the N entries in an RCT and there is no need for a "working memory". For example, there is one snippet of code that checks for cable break, rather than N entries in the RCT, one for each pair of interfaces, i.e for each cable. This benefit is magnified when there are several conditions that use the same relationship(s). This is because the relationship is stored once but used multiple times whereas with an RCT, the number of rows corresponds to the number of conditions times the number of entries in this relationship. This approach is particularly attractive when the associated parameters and relationships are already being stored by the application and it is feasible to use this state to extract the parameters for each associated scenario. Thus, an embodiment of the disclosed may be faster and use less space in some cases.

One might consider the specification of subconditions and subcondition implication as just a distributed specification of the rule condition. To some degree this is true. However, a key aspect of the disclosed is considering the entire rule set during compilation. This allows determination and handling of the relationship between rule conditions to be made explicit, allowing the rule set to be checked automatically for consistency and ambiguity. This enables ensuring that these conditions are consistent or at least allowing these conditions to be automatically checked for consistency. Moreover, the rule conditions may be automatically disambiguated by back propagation, to the degree possible within the model specification.

Figure 11:
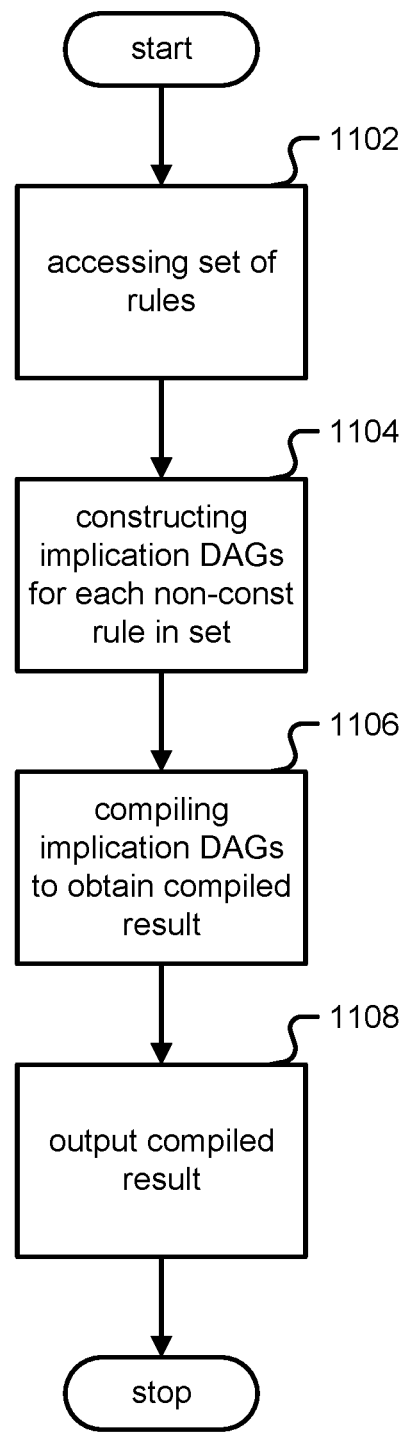
FIG. 11 is a flow chart illustrating an embodiment of a process for automatic generation of a rule set implementation.

FIG. 11 is a flow chart illustrating an embodiment of a process for automatic generation of a rule set implementation. In one embodiment, the system of FIG. 1 carries out the process of FIG. 11.

In step (1102), a set of rules of accessed. In one embodiment, the set of rules are embedded in an object model that specifies elements and their relationships, for example including specifying subcondition implications associated with elements in the object model.

For each non-const rule in the set of rules, one or more implication DAGs are constructed in step (1104), wherein the non-const rule directly causes at least one external output or at least one external action; and the one or more implication DAGs specify rule conditions, including one or more observable rule conditions. The implication DAGs are so named because they represent the implications from the rule condition through to the input conditions/attributes so therefore, the leaves of each DAG indicate the input conditions to evaluate in order to evaluate the rule condition.

In one embodiment, the constructing of the one or more implication DAGs is based at least in part on one or more applicable const rules, for example the one or more applicable const rules are derived from the non-const rule or are specified in the set of rules and/or the one or more applicable const rules do not generate external outputs or external actions.

In step (1106), implication DAGs that are constructed for the set of rules are compiled to obtain a compiled result that is configured to evaluate rule conditions associated with the set of rules and determine one or more actions when at least one of the rule conditions evaluates to true. In one embodiment, compiling the implication DAGs includes performing back propagation of symptoms to eliminate ambiguity.

In step (1108), the compiled result is output. The compiled result can include a table that is matched against to perform rule condition evaluation. The compiled result can also include generated code that explicitly evaluates the rule conditions, for example the generated code is parameterized in terms of the elements and inputs involved in the rule conditions, and/or the generated code, when executed, reacts to individual input changes to re-evaluate one or more rule conditions that depend on the inputs.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor; and
a memory coupled with the processor, wherein the memory is configured to provide the processor with instructions which when executed cause the processor to:
access a set of rules for an RBS (rule-based system) from a rule base, wherein the RBS comprises the rule base and an RBS inference engine to take action based at least in part on RBS condition matching and RBS conflict resolution;
for each non-const rule in the set of rules, construct one or more implication directed acyclic graphs (DAGs), wherein:
the non-const rule directly causes at least one external output or at least one external action; and
the one or more implication DAGs specify rule conditions, including one or more observable rule conditions;
compile implication DAGs that are constructed for the set of rules to obtain a compiled result that is configured to evaluate rule conditions associated with the set of rules and determine one or more actions for the RBS inference engine when at least one of the rule conditions evaluates to true;
output the compiled result;
perform RBS condition matching based at least in part on the compiled result;
create a set of matched action labels based at least in part on the RBS condition matching; and
apply RBS conflict resolution based at least in part on the set of matched action labels.

2. The system of claim 1, wherein the constructing of the one or more implication DAGs is based at least in part on one or more applicable const rules.

3. The system of claim 1, wherein the constructing of the one or more implication DAGs is based at least in part on one or more applicable const rules and wherein the one or more applicable const rules are derived from the non-const rule or are specified in the set of rules.

4. The system of claim 1, wherein the constructing of the one or more implication DAGs is based at least in part on one or more applicable const rules and wherein the one or more applicable const rules do not generate external outputs or external actions.

5. The system of claim 1, wherein the set of rules are embedded in an object model that specifies elements and their relationships.

6. The system of claim 1, wherein the set of rules are embedded in an object model that specifies elements and their relationships, including specifying subcondition implications associated with elements in the object model.

7. The system of claim 1, wherein the compiled result includes a table that is matched against to perform rule condition evaluation.

8. The system of claim 1, wherein the compiled result includes generated code that explicitly evaluates the rule conditions.

9. The system of claim 1, wherein the compiled result includes generated code that explicitly evaluates the rule conditions and wherein the generated code is parameterized in terms of the elements and inputs involved in the rule conditions.

10. The system of claim 1, wherein the compiled result includes generated code that explicitly evaluates the rule conditions and wherein the generated code, when executed, reacts to individual input changes to re-evaluate one or more rule conditions that depend on the inputs.

11. The system of claim 1, wherein compiling the implication DAGs includes performing back propagation of symptoms to eliminate ambiguity.

12. A method of automatically generating a rule set implementation, comprising:
- accessing a set of rules for an RBS (rule-based system) from a rule base, wherein the RBS comprises the rule base and an RBS inference engine to take action based at least in part on RBS condition matching and RBS conflict resolution;
- for each non-const rule in the set of rules, constructing one or more implication directed acyclic graphs (DAGs), wherein:
  - the non-const rule directly causes at least one external output or at least one external action; and
  - the one or more implication DAGs specify rule conditions, including one or more observable rule conditions;
- compiling implication DAGs that are constructed for the set of rules to obtain a compiled result that is configured to evaluate rule conditions associated with the set of rules, determine at least one of the rule conditions evaluates to true, and determine one or more actions for the RBS inference engine based at least in part on the determination that at least one of the rule conditions evaluates to true;
- outputting the compiled result;
- performing RBS condition matching based at least in part on the compiled result;
- creating a set of matched action labels based at least in part on the RBS condition matching; and
- applying RBS conflict resolution based at least in part on the set of matched action labels.

13. The method of claim 12, wherein the constructing of the one or more implication DAGs is based at least in part on one or more applicable const rules.

14. The method of claim 12, wherein the set of rules are embedded in an object model that specifies elements and their relationships.

15. The method of claim 12, wherein the compiled result includes a table that is matched against to perform rule condition evaluation.

16. The method of claim 12, wherein the compiled result includes generated code that explicitly evaluates the rule conditions.

17. The method of claim 12, wherein the compiled result includes generated code that explicitly evaluates the rule conditions and wherein the generated code is parameterized in terms of the elements and inputs involved in the rule conditions.

18. The method of claim 12, wherein the compiled result includes generated code that explicitly evaluates the rule conditions and wherein the generated code, when executed, reacts to individual input changes to re-evaluate one or more rule conditions that depend on the inputs.

19. The method of claim 12, wherein compiling the implication DAGs includes performing back propagation of symptoms to eliminate ambiguity.

20. A computer program product, the computer program product being embodied in a non-transitory computer readable storage medium and comprising computer instructions for:
- accessing a set of rules for an RBS (rule-based system) from a rule base, wherein the RBS comprises the rule base and an RBS inference engine to take action based at least in part on RBS condition matching and RBS conflict resolution;
- for each non-const rule in the set of rules, constructing one or more implication directed acyclic graphs (DAGs), wherein:
  - the non-const rule directly causes at least one external output or at least one external action; and
  - the one or more implication DAGs specify rule conditions, including one or more observable rule conditions;
- compiling implication DAGs that are constructed for the set of rules to obtain a compiled result that is configured to evaluate rule conditions associated with the set of rules, determine at least one of the rule conditions evaluates to true, and determine one or more actions for the RBS inference engine based at least in part on the determination that at least one of the rule conditions evaluates to true;
- outputting the compiled result;
- performing RBS condition matching based at least in part on the compiled result;
- creating a set of matched action labels based at least in part on the RBS condition matching; and
- applying RBS conflict resolution based at least in part on the set of matched action labels.

* * * * *